(12) United States Patent
Bruno et al.

(10) Patent No.: US 12,344,688 B2
(45) Date of Patent: Jul. 1, 2025

(54) SOLUTION-PROCESSABLE TRIAZOLE-BASED POLYMERS AND METHODS OF MAKING THE SAME

(71) Applicant: Georgia Tech Research Corporation, Atlanta, GA (US)

(72) Inventors: Nicholas Bruno, Atlanta, GA (US); M. G. Finn, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 656 days.

(21) Appl. No.: 17/634,406

(22) PCT Filed: Aug. 20, 2020

(86) PCT No.: PCT/US2020/047259
§ 371 (c)(1),
(2) Date: Feb. 10, 2022

(87) PCT Pub. No.: WO2021/041162
PCT Pub. Date: Mar. 4, 2021

(65) Prior Publication Data
US 2022/0298274 A1 Sep. 22, 2022

Related U.S. Application Data

(60) Provisional application No. 62/892,381, filed on Aug. 27, 2019.

(51) Int. Cl.
C08F 26/06 (2006.01)
C08F 2/06 (2006.01)
C08F 4/26 (2006.01)

(52) U.S. Cl.
CPC ............... *C08F 26/06* (2013.01); *C08F 2/06* (2013.01); *C08F 4/26* (2013.01)

(58) Field of Classification Search
None
See application file for complete search history.

(56) References Cited

U.S. PATENT DOCUMENTS

2011/0097419 A1    4/2011  Hammond et al.

OTHER PUBLICATIONS

Sugai et al., "Effective Click Construction of Bridged and Spiro-Multicyclic Polymer Topologies with Tailored Cyclic Prepolymers (kyklo-Telechelics)", Journal of the American Chemical Society, Jul. 2, 2010, vol. 132, 14790-14802; Abstract p. 14791.
Bezzu et al., "A Spirobifluorene-Based Polymer of Intrinsic Microporosity with Improved Performance for Gas Separation", Advanced Materials , Sep. 7, 2012, vol. 24, pp. 5930-5933, p. 5931.
Yamamoto et al., "Topological polymer chemistry by programmed self-assembly and effective linking chemistry", European Polymer Journal, Oct. 22, 2010, vol. 47, pp. 535-541, p. 540.
International Search Report and Written Opinion dated Jan. 14, 2021 from corresponding International PCT Application No. PCT/US2020/047259.
International Preliminary Report on Patentability in related PCT Application No. PCT/US2020/047259, mailed Mar. 10, 2022.

*Primary Examiner* — Satya B Sastri
(74) *Attorney, Agent, or Firm* — TROUTMAN PEPPER LOCKE LLP; John A. Morrissett; Celeste K. Walker

(57) ABSTRACT

Disclosed herein are polymers comprising at least one alkyne functional group, at least one azide functional group, and a conformational bend outside of coplanarity of 30 or greater. Also disclosed herein are methods of making and using the same.

8 Claims, 8 Drawing Sheets

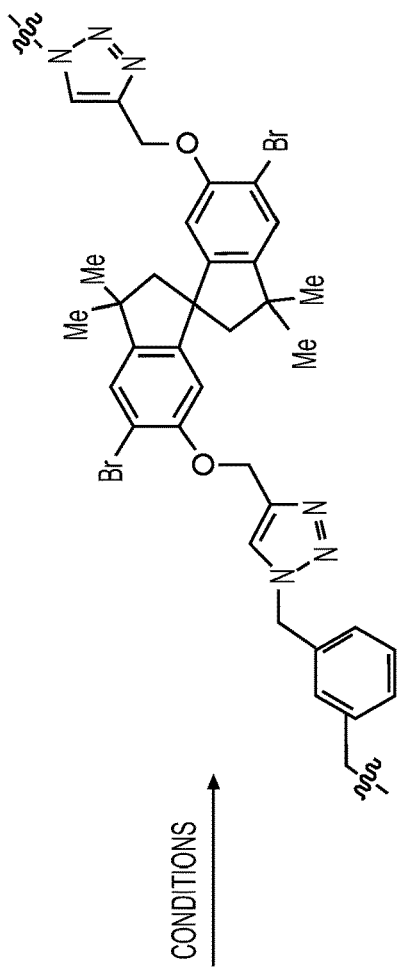
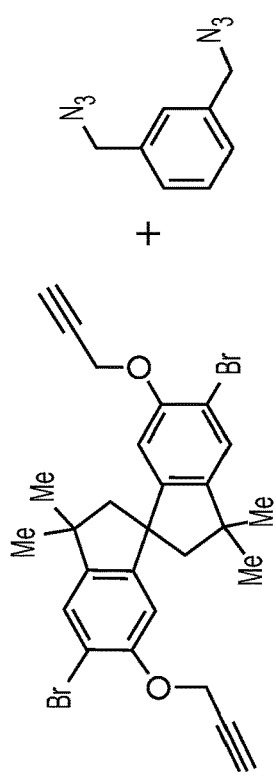
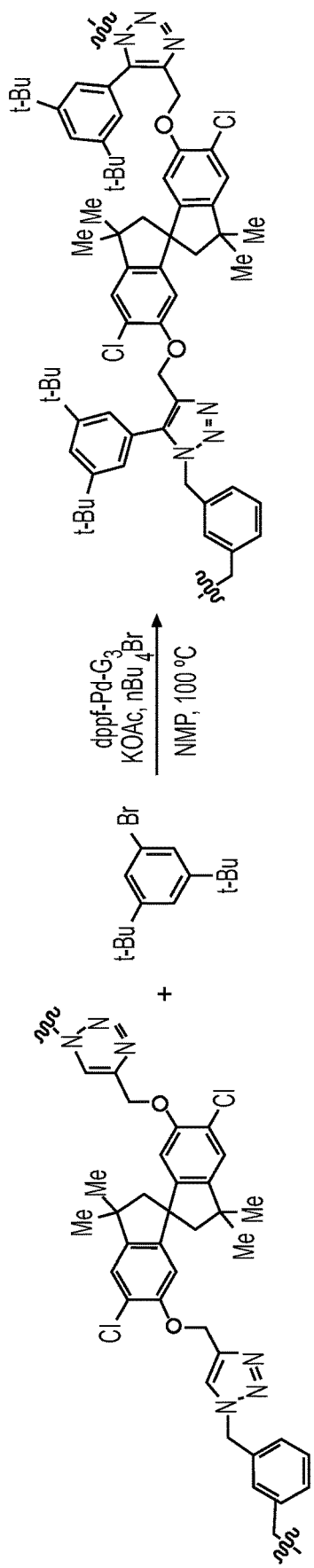
FIG. 3A
FIG. 3B

US 12,344,688 B2

SOLUTION-PROCESSABLE TRIAZOLE-BASED POLYMERS AND METHODS OF MAKING THE SAME

CROSS-REFERENCE TO RELATED APPLICATION

This application claims priority to and the benefit of U.S. Provisional Patent Application No. 62/892,381, filed Aug. 27, 2019.

FIELD OF THE DISCLOSURE

The present disclosure relates generally to improved polymers and methods of making the same. Particularly, embodiments of the present disclosure relate to improved solution-processable polymers and methods of making the same.

BACKGROUND

Polymeric membranes have emerged as a possible energy-efficient molecular separation platform relative to traditional energy intensive processes, such as distillation. Membranes that combine porosity and rigidity can allow for high permeability and good selectivity. Current approaches for such polymeric membranes can be limited by, for instance, solution processability, ability to maintain constant pore sizes in solvent, limited tunability of pore sizes, and limited functional group tolerance. Improvements in polymeric membrane technology could expand the design space of certain industries, such as hydrocarbon refining, water purification, gas separation, energy production, and the like. As such, improved polymers and methods of making said polymers for use, for instance, in membranes are desirable.

BRIEF SUMMARY OF THE INVENTION

Briefly described, embodiments of the presently disclosed subject matter generally relate to polymers, and, more particularly, to solution-processable polytriazoles.

Disclosed herein are, for instance, polymers made from monomers containing at least one alkyne functional group or at least one azide functional group. In addition, at least one monomer has a structural or conformational bend in which the bonds connecting it to the next monomers in the chain are 30° or greater away from co-planarity. In some embodiments, the polymer can comprise two or more azide functional groups. In some embodiments, the polymer can comprise two or more alkyne functional groups. In some embodiments, the polymer can comprise at least one spirocenter. In some embodiments, the polymer can comprise a kinked polymer chain. Also disclosed herein are methods of making and using the same.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

FIG. 3a illustrates a reaction scheme for making a polymer according to some embodiments of the present disclosure.

FIG. 3b illustrates a reaction scheme for modifying a polymer according to some embodiments of the present disclosure.

DETAILED DESCRIPTION

Figure 1:
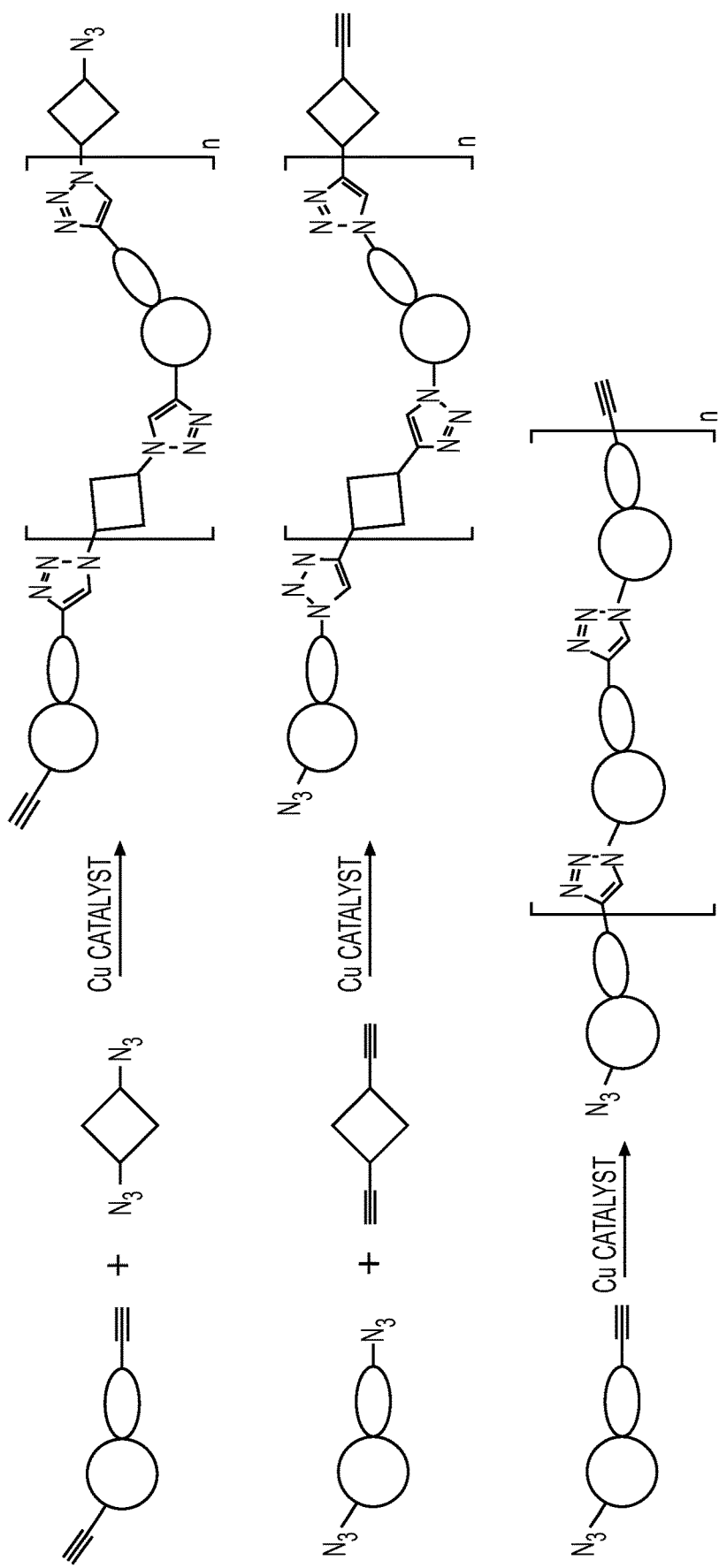
FIG. 1 illustrates reaction schemes for making a polymer according to some embodiments of the present disclosure. In this Figure, the joined circle and oval represent a kinked or spirocenter-containing monomer.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

The term "aliphatic" or "aliphatic group," as used herein, means a straight-chain (i.e., unbranched) or branched, substituted or unsubstituted hydrocarbon chain that is completely saturated or that contains one or more units of unsaturation, or a monocyclic hydrocarbon, bicyclic hydrocarbon, or tricyclic hydrocarbon that is completely saturated or that contains one or more units of unsaturation, but which is not aromatic (also referred to herein as "carbocycle," "cycloaliphatic" or "cycloalkyl"), that has a single point of attachment to the rest of the molecule. Unless otherwise specified, aliphatic groups contain 1-30 aliphatic carbon atoms. In some embodiments, aliphatic groups contain 1-20 aliphatic carbon atoms. In other embodiments, aliphatic groups contain 1-10 aliphatic carbon atoms. In still other embodiments, aliphatic groups contain 1-6 aliphatic carbon atoms, and in yet other embodiments, aliphatic groups contain 1, 2, 3, or 4 aliphatic carbon atoms. Suitable aliphatic groups include, but are not limited to, linear or branched, substituted or unsubstituted alkyl, alkenyl, alkynyl groups and hybrids thereof such as (cycloalkyl)alkyl, (cycloalkenyl)alkyl or (cycloalkyl)alkenyl.

The term "cycloaliphatic," as used herein, refers to saturated or partially unsaturated cyclic aliphatic monocyclic, bicyclic, or polycyclic ring systems, as described herein, having from 3 to 14 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic," may also include aliphatic rings that are fused to one or more aromatic or nonaromatic rings, such as decahydronaphthyl or tetrahydronaphthyl, where the radical or point of attachment is on the aliphatic ring. In some embodiments, a carbocyclic group is bicyclic. In some embodiments, a 'carbocyclic group is tricyclic. In some embodiments, a carbocyclic group is polycyclic. In some embodiments, "cycloaliphatic" (or "carbocycle" or "cycloalkyl") refers to a monocyclic C3-C6 hydrocarbon, or a C8-C10 bicyclic hydrocarbon that is completely saturated or that contains one or more units of unsaturation, but which is not aromatic, that has a single point of attachment to the rest of the molecule, or a C9-C16 tricyclic hydrocarbon that is completely saturated or that contains one or more units of unsaturation, but which is not aromatic, that has a single point of attachment to the rest of the molecule.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has 1-20 carbon atoms in its backbone (e.g., C1-C20 for straight chain, C2-C20 for branched chain), and alternatively, 1-10 carbon atoms, or 1 to 6 carbon atoms. In some embodiments, a cycloalkyl ring has from 3-10 carbon atoms in their ring structure where such rings are monocyclic or bicyclic, and alternatively 5, 6 or 7 carbons in the ring structure. In some embodiments, an alkyl group may be a lower alkyl group, wherein a lower alkyl group comprises 1-4 carbon atoms (e.g., C1-C4 for straight chain lower alkyls).

As used herein, the term "alkenyl" refers to an alkyl group, as defined herein, having one or more double bonds.

As used herein, the term "alkynyl" refers to an alkyl group, as defined herein, having one or more triple bonds.

As used herein, the term "azide" is given its ordinary meaning in the art and may include an alkyl group, as defined herein, having one or more azide functional groups.

The term "heteroalkyl" is given its ordinary meaning in the art and refers to alkyl groups as described herein in which one or more carbon atoms is replaced with a heteroatom (e.g., oxygen, nitrogen, sulfur, and the like). Examples of heteroalkyl groups include, but are not limited to, alkoxy, poly(ethylene glycol), alkyl-substituted amino, tetrahydrofuranyl, piperidinyl, morpholinyl, etc.

The term "aryl" used alone or as part of a larger moiety as in "aralkyl," "aralkoxy," or "aryloxyalkyl," refers to monocyclic or bicyclic ring systems having a total of five to fourteen ring members, wherein at least one ring in the system is aromatic and wherein each ring in the system contains 3 to 7 ring members. The term "aryl" may be used interchangeably with the term "aryl ring." In certain embodiments of the present invention, "aryl" refers to an aromatic ring system which includes, but not limited to, phenyl, biphenyl, naphthyl, binaphthyl, anthracyl and the like, which may bear one or more substituents. Also included within the scope of the term "aryl," as it is used herein, is a group in which an aromatic ring is fused to one or more non-aromatic rings, such as indanyl, phthalimidyl, naphthimidyl, phenanthridinyl, or tetrahydronaphthyl, and the like.

The terms "heteroaryl" and "heteroar-," used alone of as part of a larger moiety, e.g., "heteroaralkyl," or "heteroaralkoxy," refer to groups having 5 to 10 ring atoms (i.e., monocyclic or bicyclic), in some embodiments 5, 6, 9, or 10 ring atoms. In some embodiments, such rings have 6, 10, or 14π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, and pteridinyl. In some embodiments, a heteroaryl is a heterobiaryl group, such as bipyridyl and the like. The terms "heteroaryl" and "heteroar-," as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be monocyclic, bicyclic, tricyclic, tetracyclic, and/or otherwise polycyclic. The term "heteroaryl" may be used interchangeably with the terms "heteroaryl ring," "heteroaryl group," or "heteroaromatic," any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle," "heterocyclyl," "heterocyclic radical," and "heterocyclic ring" are used interchangeably and refer to a stable 5- to 7-membered monocyclic or 7-10-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothiophenyl pyrrolidinyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle," "heterocyclyl," "heterocyclyl ring," "heterocyclic group," "heterocyclic moiety," and "heterocyclic radical," are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl. A heterocyclyl group may be monocyclic, bicyclic, tricyclic, tetracyclic, and/or otherwise polycyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation but is not intended to include aryl or heteroaryl moieties, as herein defined.

The term "heteroatom" means one or more of oxygen, sulfur, nitrogen, phosphorus, or silicon (including, any oxidized form of nitrogen, sulfur, phosphorus, or silicon; the quaternized form of any basic nitrogen or; a substitutable nitrogen of a heterocyclic ring.

The term "unsaturated," as used herein, means that a moiety has one or more units of unsaturation.

The term "halogen" means F, Cl, Br, or I; the term "halide" refers to a halogen radical or substituent, namely —F, —Cl, —Br, or —I.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein.

The term "spiro compound" refers to a chemical compound that presents a twisted structure of two or more rings, in which at least 2 rings are linked together by one common atom, e.g., a carbon atom. When the common atom is located in the center of the compound, the compound is referred to as a "spirocentric compound." The common atom that connects the two or more rings is referred to as the "spiro-atom." When such common atom is a carbon atom, it is referred to as the "spiro-carbon."

Unless otherwise stated, all tautomeric forms of the compounds of the invention are within the scope of the invention.

Additionally, unless otherwise stated, structures depicted herein are also meant to include compounds that differ only in the presence of one or more isotopically enriched atoms. For example, compounds having the present structures except for the replacement of hydrogen by deuterium or tritium, or the replacement of a carbon by a 11C- or 13C- or 14C-enriched carbon are within the scope of this invention.

Disclosed herein are polymers produced from a non-flat monomer. In some embodiments, the non-flat monomer (i.e., a monomer having a non-flat structure or conformation) can be provided in any desired conformational configuration to confer a desirable property to the polymer. As used herein, the term "non-flat" refers to an organic structure wherein the bonds connecting a monomer to its neighboring monomers in the polymer chain are out of plane with each other.

Figure 6:
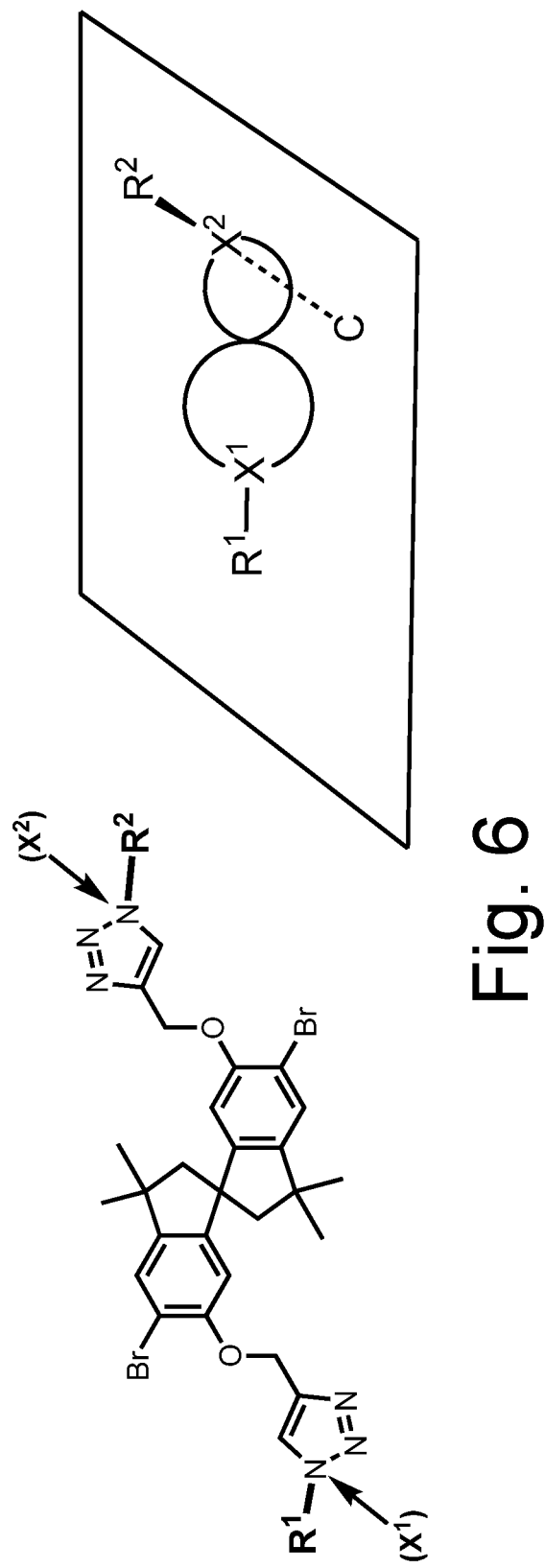
FIG. 6 illustrates an example of a non-flat compound according to some embodiments of the present disclosure.

"Out of plane" is defined with the aid of FIG. 6, as reproduced below. FIG. 6 shows an example of a non-flat monomer on the left, and a schematic representation on the right. The connecting bonds to neighboring monomers are designated $X^1$—$R^1$ and $X^2$—$R^2$. In the structure under consideration, an imaginary line is drawn along the $X^2$—$R^2$ axis until it reaches a point (designated C) that is coplanar with the $X^1$—$R^1$ axis. The monomer is "out of plane" if the angle between the line defined by $R^2$—$X^2$—C and the plane defined by the points $R^1$, $X^1$, and C is 30 degrees or greater.

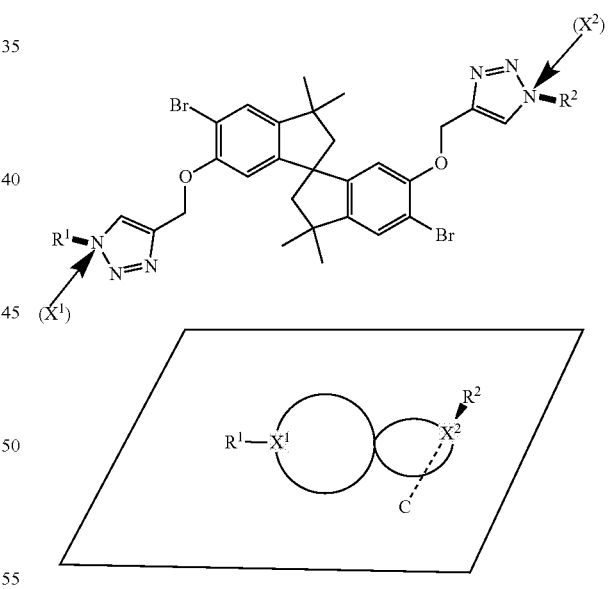

Figure 5A:
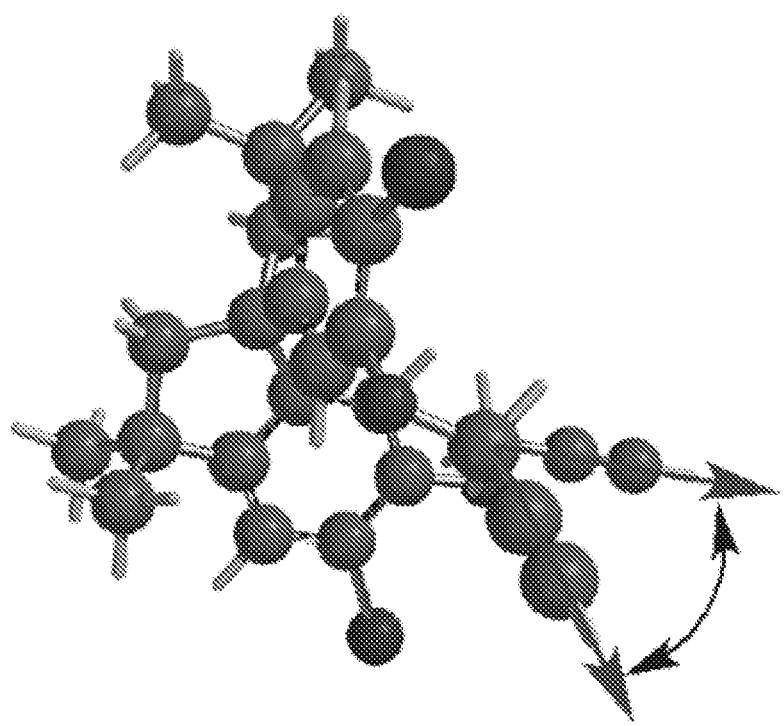
FIG. 5a is a rendering of a non-flat monomer for making a polymer according to some embodiments of the present disclosure, showing the angle between alkyne groups on each end of the monomer structure.
Figure 5B:
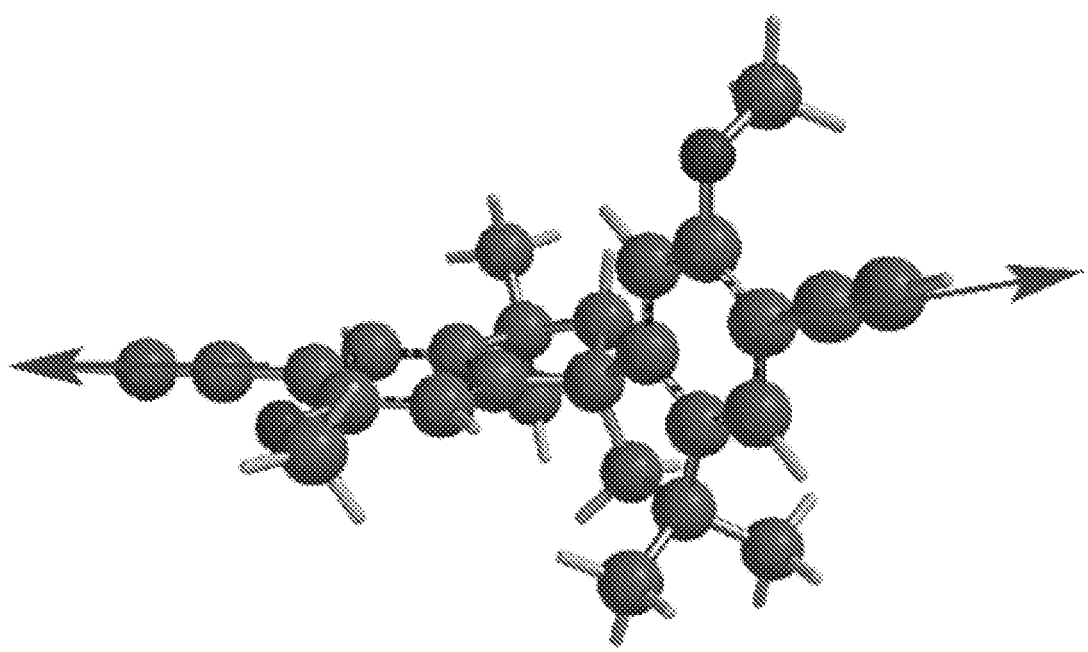
FIG. 5b is a rendering of a non-flat monomer for making a microporous polymer according to some embodiments of the present disclosure, showing the angle between alkyne groups on each end of the monomer structure.

For example, in a monomer comprising two alkyne functional groups, the alpha carbon-alkyne carbon bonds for each functional group can have a dihedral out-of-plane angle of 35 degrees or greater. In some embodiments, the out-of-plane angle can be 30 degrees or greater (e.g., 31 degrees or greater, 32 degrees or greater, 33 degrees or greater, 34 degrees or greater, 35 degrees or greater, 40 degrees or greater, 45 degrees or greater, 50 degrees or greater, 55 degrees or greater, 60 degrees or greater, 65 degrees or greater, 70 degrees or greater, 75 degrees or greater, 80 degrees or greater, 85 degrees or greater, or 90 degrees or greater) for any accessible conformational minimum. In some embodiments, the out-of-plane angle can be 180 degrees or less (e.g., 175 degrees or less, 170 degrees or less, 165 degrees or less, 160 degrees or less, 155 degrees or less, 150 degrees or less, 145 degrees or less, 140 degrees or less, 135 degrees or less, 130 degrees or less, 125 degrees or less, 120 degrees or less, 115 degrees or less, 110 degrees or less, 105 degrees or less, or 100 degrees or less) for any accessible conformational minimum. In some embodiments, the out-of-plane angle can be from 30 degrees to 180 degrees (e.g., from 30 degrees to 115 degrees, from 30 degrees to 90 degrees, from 30 degrees to 45 degrees, from 90 degrees to 180 degrees, from 115 degrees to 180 degrees, from 45 degrees to 90 degrees, from 45 degrees to 115 degrees, or from 45 degrees to 180 degrees) for any accessible conformational minimum. Non-limiting examples of a "non-flat" monomer can be seen in FIG. 5a and FIG. 5b. The monomers shown in FIG. 5a and FIG. 5b have out-of-plane bends of 30 degrees, as shown.

In some embodiments, the non-flat monomer can comprise an organic compound. The organic compound can comprise one or more organic functional groups (e.g., two or more, three or more, four or more, five or more, six or more, or seven or more). Suitable examples of an organic functional group can include, but are not limited to: alkanes, alkenes, alkynes, aromatics, benzene or phenyl derivatives, haloalkanes, fluoroalkanes, chloroalkanes, bromoalkanes, iodoalkanes, alcohols, ketones, aldehydes, acyl halides, carbonates, carboxylates, carboxylic acids, esters, hydroperoxides, peroxides, ethers, hemiacetals, hemiketals, acetals, orthoesters, heterocycles, organic acid anhydrides, amides, amines, imines, imides, azides, azo compounds, cyanates, nitrates, nitriles, nitrites, nitro compounds, nitroso compounds, oximes, pyridine or pyridine derivatives, carbamate esters, thiols, sulfides, disulfides, sulfoxides, sulfones, sulfinic acids, sulfonic acids, sulfonate esters, thiocyanates, thioketones, thials, thiocarboxylic acids, thioesters, phosphines, phosphanes, phosphonic acids, phosphates, phosphodiesters, boronic acids, boronic esters, borinic acids, borinic esters, epoxides, cycloalkanes, pyrroles, thiophenes, pyrans, furans, dioxins, furfurals, imidazoles, pyrimidines, toluenes, thiazoles, pyrazoles, oxazoles, triazoles, purines, or any combination thereof. Additional functional groups known to one of ordinary skill in the art may be chosen to confer certain desirable properties to the non-flat monomer. In some embodiments, the organic compound can comprise multiple instances of the same functional group.

Figure 2:
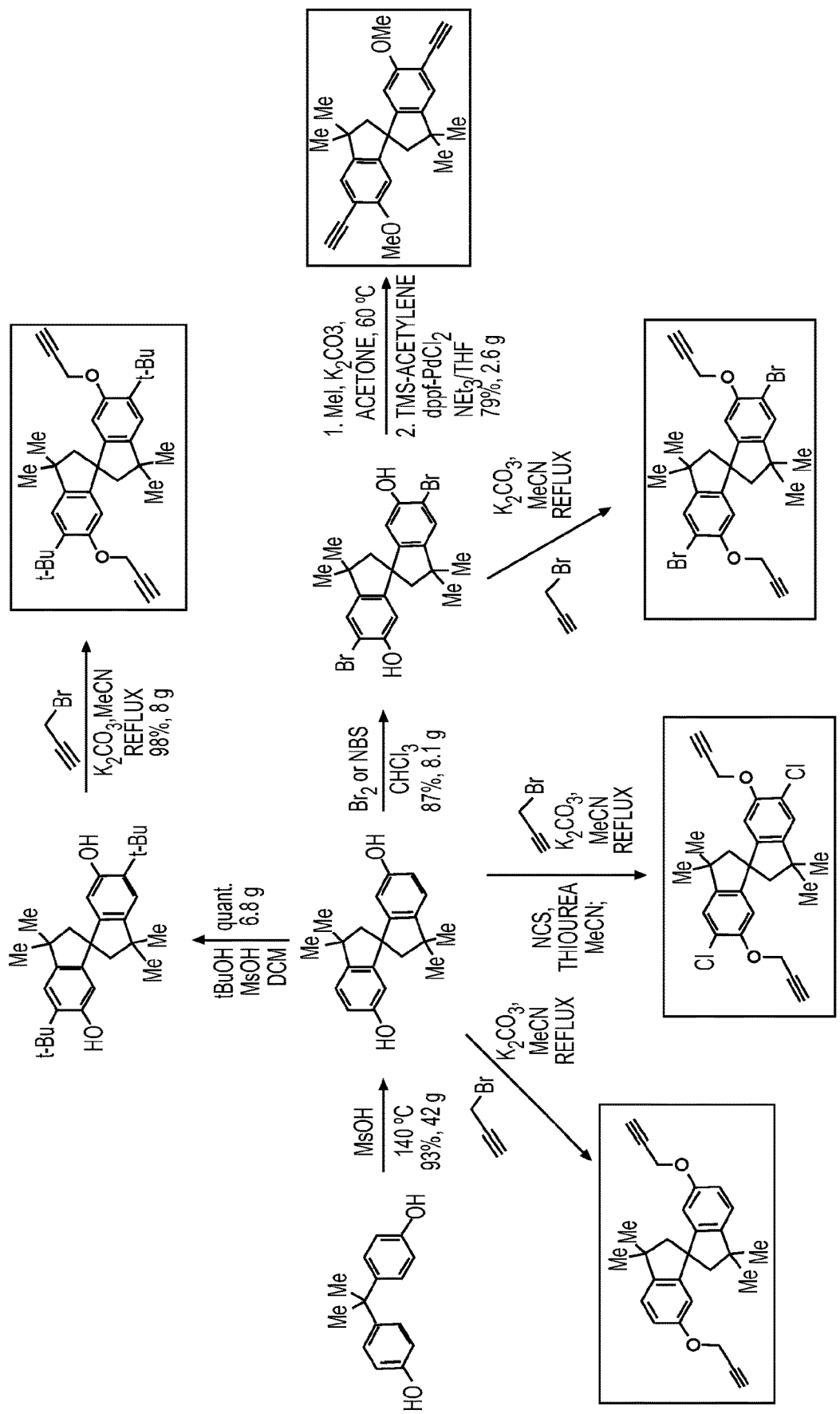
FIG. 2 illustrates reaction schemes for making a representative type of monomer used to construct polymers according to some embodiments of the present disclosure.

Non-limiting examples of a non-flat monomer are depicted in FIG. 2. As shown in FIG. 2, the non-flat monomer can be synthesized from a number of reactions and reaction conditions. In some embodiments, the non-flat monomer is a spiro compound having at least one (e.g., 2, 3, 4, 5, 6, 7, 8, 9, or 10) spirocenters. In some embodiments, the non-flat monomer comprises at least one (e.g., 2, 3, 4, 5, 6, 7, 8, 9, or 10) azide functional group. In some embodiments, the non-flat monomer comprises at least one (e.g., 2, 3, 4, 5, 6, 7, 8, 9, or 10) alkyne functional group, In some embodiments, the non-flat monomer comprises at least one azide functional group and at least one alkyne functional group. Further, in some embodiments, the non-flat monomer comprises at least one (e.g., 2, 3, 4, 5, 6, 7, 8, 9, or 10) alkane functional group, at least one (e.g., 2, 3, 4, 5, 6, 7, 8, 9, or 10) ester functional group, at least one (e.g., 2, 3, 4, 5, 6, 7, 8, 9, or 10) halide functional group, at least one (e.g., 2, 3, 4, 5, 6, 7, 8, 9, or 10) cycloalkane functional group, at least one (e.g., 2, 3, 4, 5, 6, 7, 8, 9, or 10) aromatic functional group, or a combination thereof.

In some embodiments, the non-flat monomer includes the following:

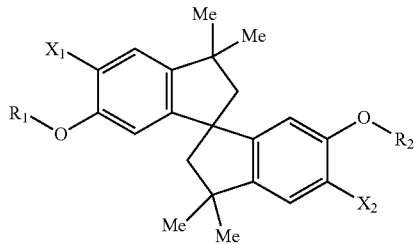

wherein $R_1$ and $R_2$ comprise any alkyl or aryl chain, alkyl or aryl chains leading to other functional groups as described above, halogens, or hydrogen. In some embodiments, $X_1$ and $X_2$ comprise any alky chain, aryl chain, halogen, hydrogen, azide, or other functional group. Additionally, in any of the embodiments disclosed herein, $R_1$, $R_2$, $X_1$, or $X_2$ may be absent. It is understood that any alkyl chains, aryl chains, or functional groups present may link or lead to other additional functional groups as disclosed herein. In some embodiments, one of either $R_1$, $R_2$, $X_1$, or $X_2$ can contain at least one azide group or at least one alkyne group in addition to any of the groups described above.

Also disclosed herein are polymers produced from a non-flat monomer and an additional monomer. In some embodiments, no additional monomer is used. In some embodiments, the additional monomer may be flat or non-flat. The reactants (e.g., the non-flat monomer and/or additional monomer) used to produce the polymer have, in some combination, an alkyne functional group and an azide functional group. In some embodiments, the non-flat monomer has an alkyne functional group and an azide functional group. In some embodiments, the non-flat monomer has an alkyne functional group and the additional monomer has an azide functional group. In some embodiments, the non-flat monomer has an azide functional group and the additional monomer has an alkyne functional group. In some embodiments, the additional monomer has an azide functional group and an alkyne functional group.

In some embodiments, the additional monomer can comprise an organic compound. Embodiments of the present disclosure can provide an organic compound comprising one or more organic functional groups (e.g., two or more, three or more, four or more, five or more, six or more, or seven or more). Suitable examples of an organic functional group can include, but are not limited to: alkanes, alkenes, alkynes, aromatics, benzene or phenyl derivatives, haloalkanes, fluoroalkanes, chloroalkanes, bromoalkanes, iodoalkanes, alcohols, ketones, aldehydes, acyl halides, carbonates, carboxylates, carboxylic acids, esters, hydroperoxides, peroxides, ethers, hemiacetals, hemiketals, acetals, orthoesters, heterocycles, organic acid anhydrides, amides, amines, imines, imides, azides, azo compounds, cyanates, nitrates, nitriles, nitrites, nitro compounds, nitroso compounds, oximes, pyridine or pyridine derivatives, carbamate esters, thiols, sulfides, disulfides, sulfoxides, sulfones, sulfinic acids, sulfonic acids, sulfonate esters, thiocyanates, thioketones, thials, thiocarboxylic acids, thioesters, phosphines, phosphanes, phosphonic acids, phosphates, phosphodiesters, boronic acids, boronic esters, borinic acids, borinic esters, epoxides, cycloalkanes, pyrroles, thiophenes, pyrans, furans, dioxins, furfurals, imidazoles, pyrimidines, toluenes, thiazoles, pyrazoles, oxazoles, triazoles, purines, or any combination thereof. Additional functional groups known to one of ordinary skill in the art may be chosen to confer certain desirable properties to the additional monomer. In some embodiments, the organic compound can comprise multiple instances of the same functional group. Additionally, the additional monomer may be selected by one of ordinary skill in the art in order to confer a desirable property to the resulting polymer. For instance, if a non-rigid polymer is desirable, the additional monomer can be selected such that the additional monomer has few functional groups that can engage in intermolecular interactions.

According to some embodiments, the additional monomer can include the following:

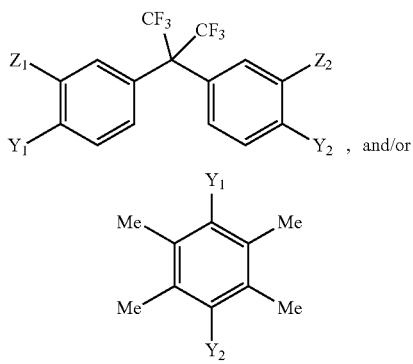

wherein $Y_1$ and $Y_2$ comprise any azide, alkyl chain, aryl chain, halogen, or other suitable functional group and $Z_1$ and $Z_2$ comprise any alky chain, aryl chain, halogen, hydrogen, azide, or other functional group. Additionally, in any of the embodiments disclosed herein, $Y_1$, $Y_2$, $Z_1$, or $Z_2$ may be absent. It is understood that any alkyl chains, aryl chains, or functional groups present may link or lead to other additional functional groups as disclosed herein. In some embodiments, one of either $Y_1$, $Y_2$, $Z_1$, or $Z_2$ can contain at least one azide group or at least one alkyne group in addition to any of the groups described above.

Other suitable examples of the additional monomer include, but are not limited to:

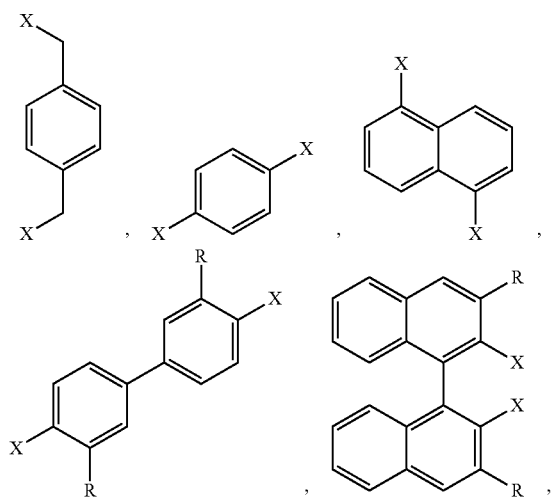

-continued

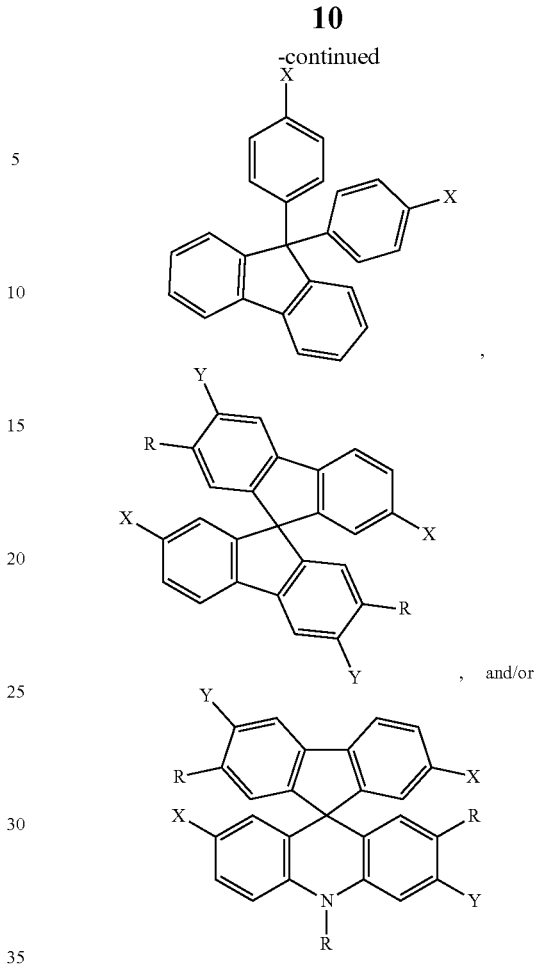

wherein R, X, and Y can include: alkanes, alkenes, alkynes, aromatics, benzene or phenyl derivatives, haloalkanes, fluoroalkanes, chloroalkanes, bromoalkanes, iodoalkanes, alcohols, ketones, aldehydes, acyl halides, carbonates, carboxylates, carboxylic acids, esters, hydroperoxides, peroxides, ethers, hemiacetals, hemiketals, acetals, orthoesters, heterocycles, organic acid anhydrides, amides, amines, imines, imides, azides, azo compounds, cyanates, nitrates, nitriles, nitrites, nitro compounds, nitroso compounds, oximes, pyridine or pyridine derivatives, carbamate esters, thiols, sulfides, disulfides, sulfoxides, sulfones, sulfinic acids, sulfonic acids, sulfonate esters, thiocyanates, thioketones, thials, thiocarboxylic acids, thioesters, phosphines, phosphanes, phosphonic acids, phosphates, phosphodiesters, boronic acids, boronic esters, borinic acids, borinic esters, epoxides, cycloalkanes, pyrroles, thiophenes, pyrans, furans, dioxins, furfurals, imidazoles, pyrimidines, toluenes, thiazoles, pyrazoles, oxazoles, triazoles, purines, or any combination thereof. Additional functional groups known to one of ordinary skill in the art may be chosen to confer certain desirable properties to the monomer or resulting polymer. In some embodiments, the additional monomer can comprise multiple instances of the same functional group. In some embodiments, one of either R or X can contain at least one azide group or at least one alkyne group in addition to any of the groups described above.

Some embodiments of the present disclosure can provide a solvent for the reaction of the non-flat monomer and/or the additional monomer. The solvent can be any substance able to substantially dissolve the non-flat monomer and/or additional monomer to create a liquid solution at room temperature and pressure. Suitable examples of a solvent can include, but are not limited to, nonpolar solvents, polar aprotic solvents, polar protic solvents, water-miscible solvents, non-coordinating solvents, or a combination thereof. There are many examples of appropriate solvents known to one of ordinary skill in the art, but suitable examples can include, but are not limited to, acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, dichloromethane, or a combination thereof.

Some embodiments of the present disclosure can provide a catalyst for the reaction of the non-flat monomer and/or the additional monomer. In some embodiments, the catalyst can comprise any material configured to confer a desired reaction mechanism to the non-flat monomer and/or the additional monomer. For instance, the catalyst can comprise a copper-containing material when the desired reaction mechanism is copper-catalyzed azide-alkyne cycloaddition, as shown in FIG. 1. Other suitable examples of catalysts that can be used include, but are not limited to the following, wherein "copper" designates either copper(I) or copper(II): copper chloride, copper bromide, copper acetate, copper iodide, copper trifluoroacetate, copper hydroxide, copper nitrate, copper fluoride, copper benzoate, copper oxalate, copper formate, copper sulfonate, as well as phosphine, N-heterocyclic carbene, and pyridine complexes of these copper-containing compounds, or any combination thereof.

The polymers disclosed herein can be produced from a non-flat monomer. In some embodiments, the polymers disclosed herein are produced by a non-flat monomer and an additional monomer. In some embodiments, the polymers can be produced by three or more monomers (e.g., four or more, five or more, six or more, seven or more).

In some embodiments, the polymer can be provided in any desired conformational configuration to confer a desirable property to the polymer. Embodiments of the present disclosure can provide a polymer wherein the polymer is "kinked." As used herein, the term "kinked" refers to a polymer comprising one or more non-flat monomers as described above. An example of a kinked polymer can be found in FIG. 6. In some embodiments, the polymer can comprise a spirocenter. In some embodiments, the polymer can comprise one or more spirocenters.

In the various polymer aspects presented below, n represents the number of repeating monomer units. As such, in some embodiments, n is an integer from 5 to 50,000 (e.g., 5, 10, 15, 20, 25, 30, 40, 50, 60, 70, 80, 90, 100, 200, 300, 400, 500, 600, 700, 800, 900, 1000, 1250, 1500, 1750, 2000, 2250, 2500, 2750, 3000, 3500, 4000, 4500, 5000, 5500, 6000, 6500, 7000, 7500, 8000, 8500, 9000, 9500, 10000, 15000, 20000, 25000, 30000, 35000, 40000, 45000, 50000). In another embodiment, n is from 5 to 20,000, or from 5 to 10,000, or from 5 to 1,000, or from 100 to 1000, or from 500 to 10,000.

According to some embodiments, the polymers according to Formula I or Formula II, below:

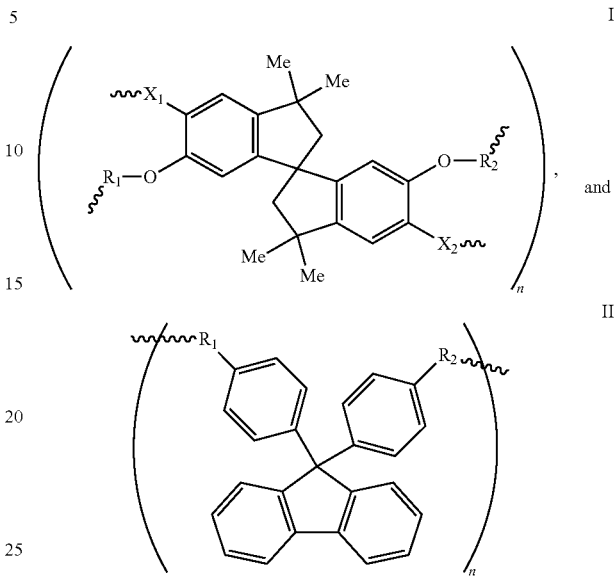

wherein $R_1$, $X_1$, $R_2$, and $X_2$, are functional side chains. Side chains designated as Me illustrated in Formula I indicate a methyl group, but it is understood that the position occupied by the Me group may be suitably substituted by any functional group.

In some embodiments, $X_1$ and $X_2$ may comprise a halogen, such as iodine, fluorine, chlorine, bromine, astatine, or combinations thereof. Further, in other embodiments, $X_1$ and $X_2$ may comprise alkyl chain groups. Suitable examples of alkyl chain groups can include, but are not limited to, tert-butyl, iso-butyl, butyl, propyl, isopropyl, ethyl, methyl, or combinations thereof. Additionally, $X_1$ and $X_2$ may comprise any aryl group or heteroatom having a bond to nitrogen, oxygen, sulfur, phosphorus, silicon, and the like. Other functional groups, such as alkyl chains, may be further bound to the functional groups indicated by $X_1$ and $X_2$.

In some embodiments, $X_1$ and $X_2$ may comprise a triazole ring. While many types of triazole chains are contemplated and within the scope of this disclosure, some embodiments can provide polymers according to Formula I or Formula II wherein $X_1$ and/or $X_2$ comprise triazole chains such as:

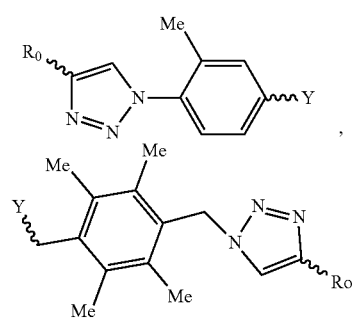

or combinations thereof, wherein $R_0$ represents a bond to Formula I at $R_1$, $R_2$, $X_1$, or $X_2$, and Y represents an additional functional side chain. In some embodiments, Y can represent a bond to the polymer. In other embodiments, the triazole at $R_0$ can be bound to any aryl, alkyl, or other suitable functional group. Side chains designated as Me indicate a methyl group, but it is understood that the position occupied by the Me group may be suitably substituted by any alkyl group. Such embodiments provide polymers linked by 1,4-triazole groups, as shown.

In some embodiments, Y may comprise alkyl chain groups. Suitable examples of alkyl chain groups can include, but are not limited to, tert-butyl, iso-butyl, butyl, propyl, isopropyl, ethyl, methyl, or combinations thereof. Additionally, Y may comprise a halogen, such as iodine, fluorine, chlorine, bromine, astatine, or combinations thereof. It is understood that Y may comprise any functional side chain to confer a desirable property to the disclosed polymers. For example, Y may be a triazole group.

According to some embodiments, Y may alternatively be a center of propagation for the polymers according to the present disclosure. For Example, a polymer according to Formula I may have a side chain $R_1$ wherein $R_1$ binds to an $R_2$ side chain of an additional unit at Y. For example, embodiments of the present disclosure may provide a polymer of Formula I or Formula II, comprising side chains $X_1$ and $X_2$ such as in Formula III and Formula IV below:

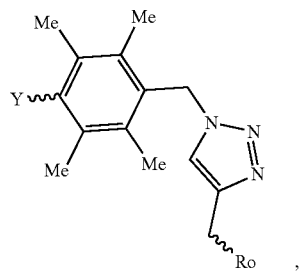

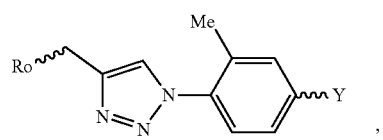

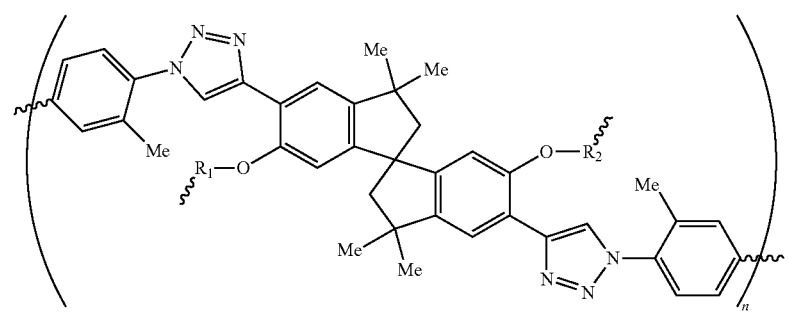

III

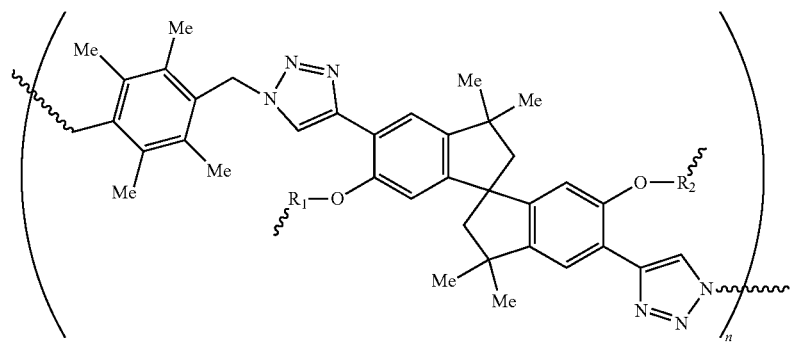

IV

According to some embodiments, $R_1$ and $R_2$ may comprise functional side chains. For instance, $R_1$ and $R_2$ may comprise alkyl or aryl chain groups. Suitable examples of alkyl chain groups can include, but are not limited to, tert-butyl, iso-butyl, butyl, propyl, isopropyl, ethyl, methyl, or combinations thereof. Further, in some embodiments, $R_1$ and $R_2$ may comprise a triazole chain. While many types of triazole chains are contemplated and within the scope of this disclosure, some embodiments can provide polymers according to any of Formula I, Formula II, Formula III, or Formula IV wherein $R_1$ and/or $R_2$ comprise triazole chains. Suitable examples of triazole chains for $R_1$ and/or $R_2$ can include, but are not limited to:

-continued

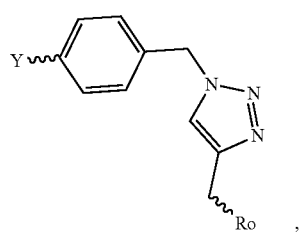

-continued

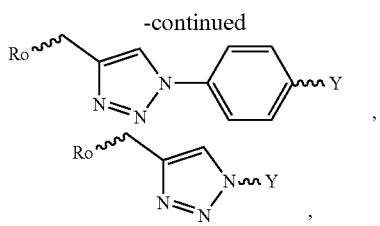

or combinations thereof, wherein $R_0$ represents a bond to Formula I at $R_1$, $R_2$, $X_1$, or $X_2$, and Y represents an additional functional side chain. In some embodiments, Y can represent a bond to the polymer. In other embodiments, the triazole at $R_0$ can be bound to any aryl, alkyl, or other suitable functional group. Side chains designated as Me illustrated in Formula I indicate a methyl group, but it is understood that the position occupied by the Me group may be suitably substituted by any alkyl group.

For example, embodiments of the present disclosure can provide a polymer of Formula I or Formula II, wherein $R_1$ and $R_2$ comprise triazole chains as described above, such as in Formula V, Formula VI, Formula VII, and Formula VIII below:

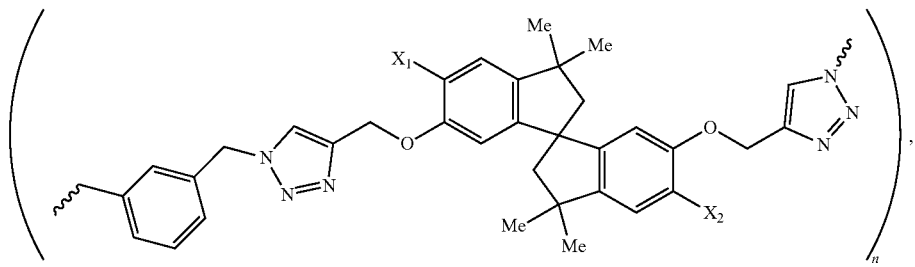

V

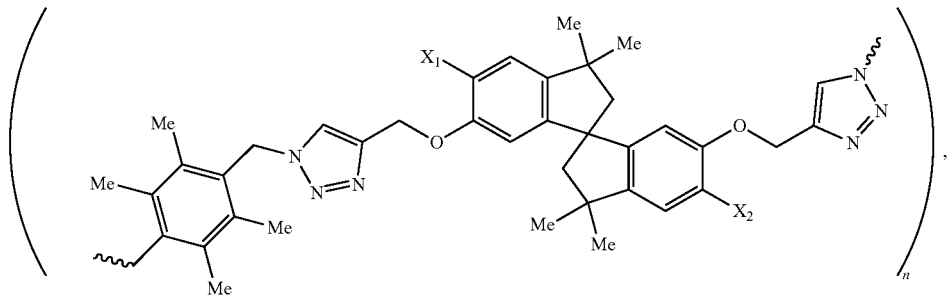

VI

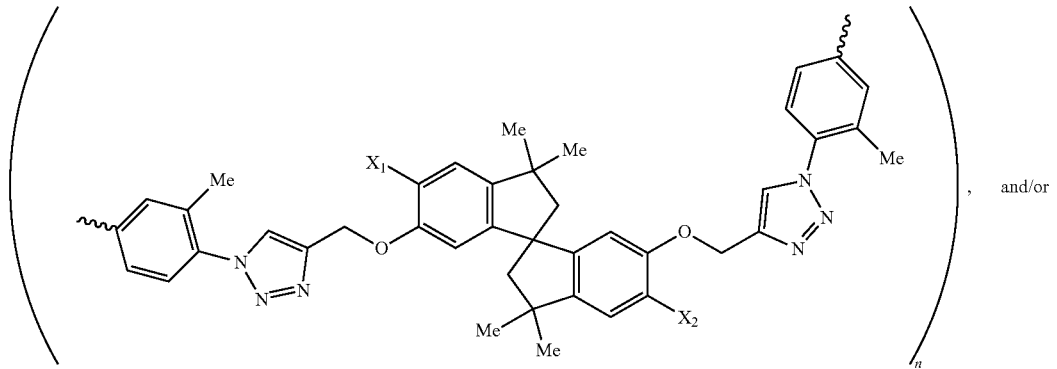

VII

, and/or

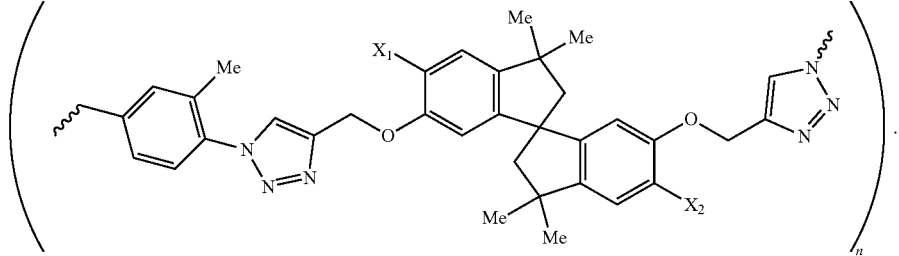

VIII

.

By way of another illustrative example, embodiments of the present disclosure can provide a polymer of Formula I or Formula II, wherein $R_1$ and $R_2$ comprise triazole chains as described above, such as in Formula IX and X below:

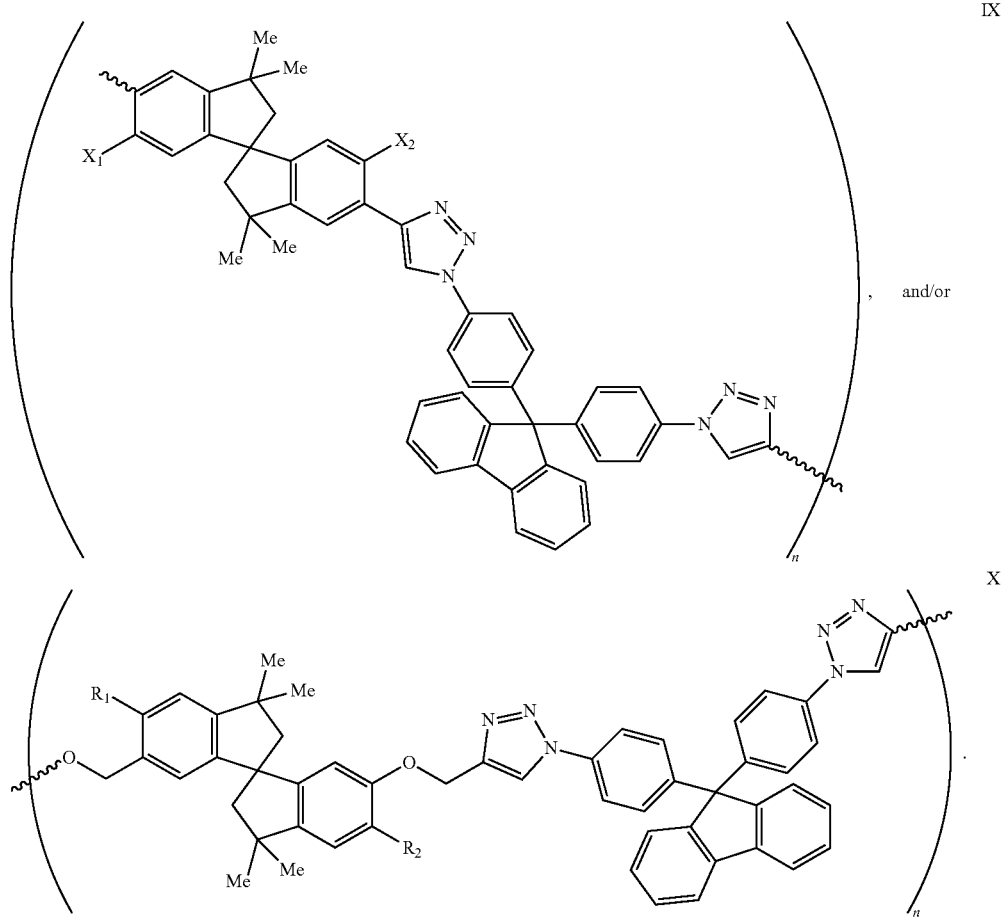

The non-flat monomer, additional monomer, and/or polymers produced therefrom can be, in some embodiments, solution-processable at mild conditions and yield membranes that can have high membrane permeability and high selectivity for separations.

In some embodiments, the polymer can present a degree of polymerization of 30 or greater (e.g., 31 or greater, 32 or greater, 33 or greater, 34 or greater, 35 or greater, 36 or greater, 37 or greater, 38 or greater, 39 or greater, 40 or greater, 41 or greater, 42 or greater, 43 or greater, 44 or greater, 45 or greater, 46 or greater, 47 or greater, 48 or greater, 49 or greater, 50 or greater, 52 or greater, 54 or greater, 56 or greater, 58 or greater, 60 or greater, 65 or greater, 70 or greater, 75 or greater, 80 or greater, 85 or greater, 90 or greater, 95 or greater, or 100 or greater) based on the number-average degree of polymerization. In some embodiments, the polymer can present a degree of polymerization of 100 or less (e.g., 31 or less, 32 or less, 33 or less, 34 or less, 35 or less, 36 or less, 37 or less, 38 or less, 39 or less, 40 or less, 41 or less, 42 or less, 43 or less, 44 or less, 45 or less, 46 or less, 47 or less, 48 or less, 49 or less, 50 or less, 52 or less, 54 or less, 56 or less, 58 or less, 60 or less, 65 or less, 70 or less, 75 or less, 80 or less, 85 or less, 90 or less, 95 or less) based on the number-average degree of polymerization. In some embodiments, the polymer can present a degree of polymerization of from 30 to 100 (e.g., from 30 to 40, from 40 to 50, from 50 to 60, from 60 to 70, from 70 to 80, from 80 to 90, from 90 to 100, from 40 to 100, from 50 to 100, from 60 to 100, from 70 to 100, from 80 to 100, from 40 to 90, from 50 to 90, from 40 to 80, from 50 to 80, from 60 to 80, or from 50 to 70) based on the number-average degree of polymerization.

In some embodiments, the polymer can present a molecular weight of 60,000 g/mol or greater (e.g., 61,000 g/mol or greater, 62,000 g/mol or greater, 63,000 g/mol or greater, 64,000 g/mol or greater, 65,000 g/mol or greater, 66,000 g/mol or greater, 67,000 g/mol or greater, 68,000 g/mol or greater, 69,000 g/mol or greater, 70,000 g/mol or greater, 75,000 g/mol or greater, 80,000 g/mol or greater, 85,000 g/mol or greater, 90,000 g/mol or greater, 95,000 g/mol or greater, 100,000 g/mol or greater, 110,000 g/mol or greater, 120,000 g/mol or greater, 130,000 g/mol or greater, 140,000 g/mol or greater, 150,000 g/mol or greater, 160,000 g/mol or greater, 170,000 g/mol or greater, 180,000 g/mol or greater, 190,000 g/mol or greater, or 200,000 g/mol or greater) based on the weight-average of molecular weights for the polymer. In some embodiments, the polymer can present a molecular weight of 200,000 g/mol or less (e.g., 61,000 g/mol or less, 62,000 g/mol or less, 63,000 g/mol or less, 64,000 g/mol or less, 65,000 g/mol or less, 66,000 g/mol or less, 67,000 g/mol or less, 68,000 g/mol or less, 69,000 g/mol or less, 70,000 g/mol or less, 75,000 g/mol or less, 80,000 g/mol or less, 85,000 g/mol or less, 90,000 g/mol or less, 95,000 g/mol or less, 100,000 g/mol or less, 110,000 g/mol or less, 120,000 g/mol or less, 130,000 g/mol or less, 140,000 g/mol or less, 150,000 g/mol or less, 160,000 g/mol or less, 170,000 g/mol or less, 180,000 g/mol or less, 190,000 g/mol or less) based on the weight-average of molecular weights for the polymer. In some embodiments, the polymer can present a molecular weight of from 60,000 to 200,000 g/mol (e.g., from 70,000 to 190,000 g/mol, from 80,000 to 180,000 g/mol, from 90,000 to 170,000 g/mol, from 100,000 to 160,000 g/mol, from 110,000 to 150,000 g/mol, from 120,000 to 140,000 g/mol, from 60,000 to 190,000 g/mol, from 60,000 to 180,000 g/mol, or from 60,000 to 170,000 g/mol) based on the weight-average of molecular weights for the polymer.

In some embodiments, the polymer can present a polydispersity index of 1 or greater (e.g., 1.1 or greater, 1.2 or greater, 1.3 or greater, 1.4 or greater, 1.5 or greater, 1.6 or greater, 1.7 or greater, 1.8 or greater, 1.9 or greater, 2 or greater, 2.1 or greater, 2.2 or greater, 2.3 or greater, 2.4 or greater, 2.5 or greater, 2.6 or greater, 2.7 or greater, 2.8 or greater, 2.9 or greater, 3 or greater, 3.1 or greater, 3.2 or greater, 3.3 or greater, 3.4 or greater, 3.5 or greater, 3.6 or greater, 3.7 or greater, 3.8 or greater, 3.9 or greater, or 4 or greater). In some embodiments, the polymer can present a polydispersity index of 4 or less (e.g., 1.1 or less, 1.2 or less, 1.3 or less, 1.4 or less, 1.5 or less, 1.6 or less, 1.7 or less, 1.8 or less, 1.9 or less, 2 or less, 2.1 or less, 2.2 or less, 2.3 or less, 2.4 or less, 2.5 or less, 2.6 or less, 2.7 or less, 2.8 or less, 2.9 or less, 3 or less, 3.1 or less, 3.2 or less, 3.3 or less, 3.4 or less, 3.5 or less, 3.6 or less, 3.7 or less, 3.8 or less, 3.9 or less). In some embodiments, the polymer can present a polydispersity index of from 1 to 4 (e.g., from 1 to 2, from 2 to 3, from 3 to 4, from 1.1 to 3.9, from 1.2 to 3.8, from 1.3 to 3.7, from 1.4 to 3.6, from 1.5 to 3.5, from 1.6 to 3.4, from 1.7 to 3.3, from 1.8 to 3.2, from 1.9 to 3.1, or from 2.1 to 2.9).

Figure 7:
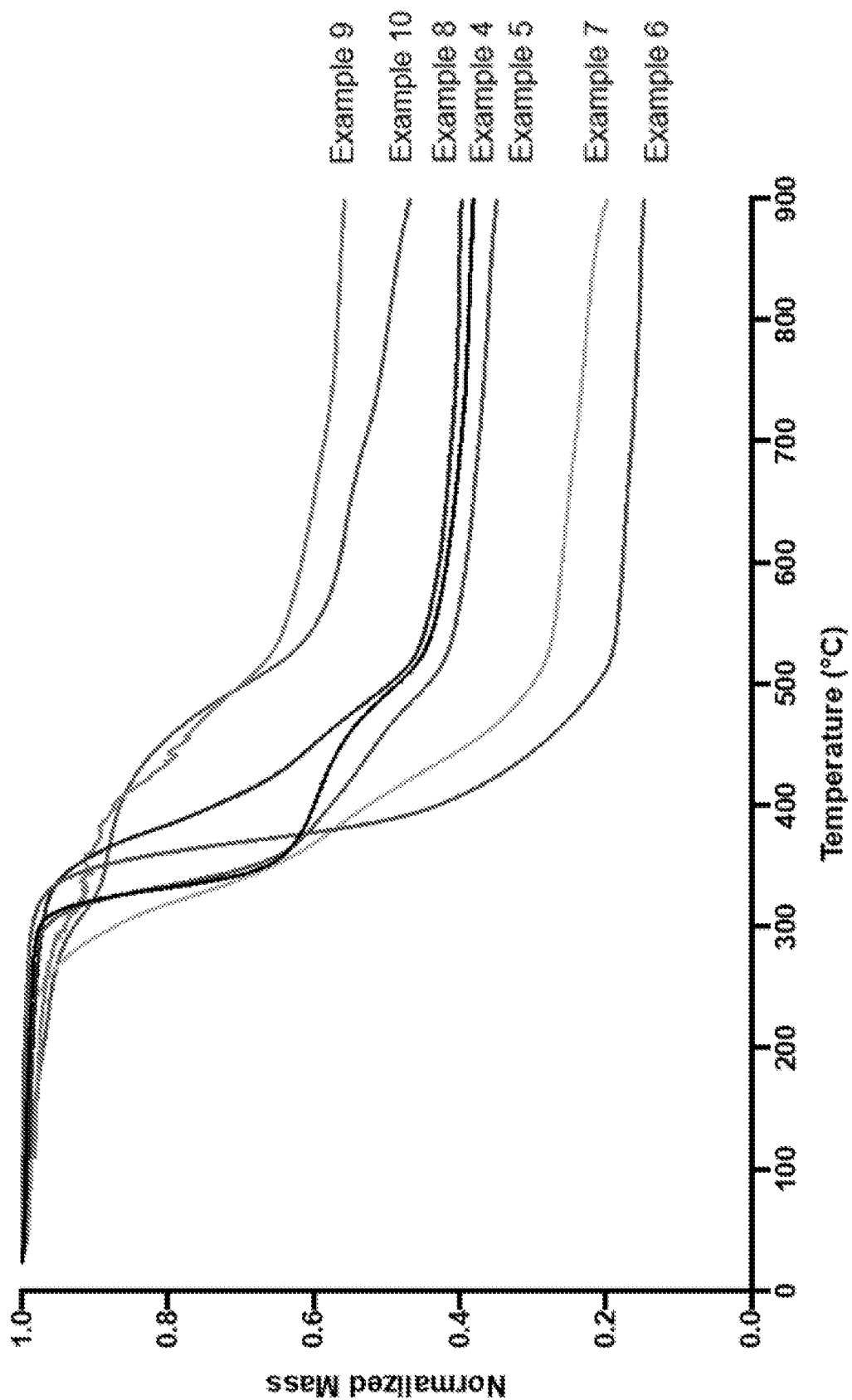
FIG. 7 is a plot of thermogravimetric analysis of degradation of selected polymers according to some embodiments of the present disclosure.

In some embodiments, the polymer can present a glass transition temperature of 150° C. or greater (e.g., 160° C. or greater, 170° C. or greater, 180° C. or greater, 190° C. or greater, 200° C. or greater, 210° C. or greater, 220° C. or greater, 230° C. or greater, 240° C. or greater, 250° C. or greater, 260° C. or greater, 270° C. or greater, 280° C. or greater, 290° C. or greater, 300° C. or greater, 310° C. or greater, 320° C. or greater, 330° C. or greater, 340° C. or greater, 350° C. or greater, 360° C. or greater, 370° C. or greater, 380° C. or greater, 390° C. or greater, 400° C. or greater, 410° C. or greater, 420° C. or greater, 430° C. or greater, 440° C. or greater, 450° C. or greater, or 460° C. or greater). In some embodiments, the polymer can have a glass transition temperature of 450° C. or less (e.g., 150° C. or less, 160° C. or less, 170° C. or less, 180° C. or less, 190° C. or less, 200° C. or less, 210° C. or less, 220° C. or less, 230° C. or less, 240° C. or less, 250° C. or less, 260° C. or less, 270° C. or less, 280° C. or less, 290° C. or less, 300° C. or less, 310° C. or less, 320° C. or less, 330° C. or less, 340° C. or less, 350° C. or less, 360° C. or less, 370° C. or less, 380° C. or less, 390° C. or less, 400° C. or less, 410° C. or less, 420° C. or less, 430° C. or less, 440° C. or less, or 450° C. or less). In some embodiments, the polymer can have a glass transition temperature of from 150° C. to 450° C. (e.g., from 160° C. to 440° C., from 170° C. to 430° C., from 180° C. to 420° C., from 190° C. to 410° C., from 200° C. to 400° C., from 250° C. to 350° C., from 150° C. to 350° C., from 150° C. to 300° C., from 150° C. to 250° C., from 150° C. to 240° C., from 150° C. to 230° C., from 150° C. to 220° C., from 150° C. to 210° C., from 150° C. to 200° C., from 150° C. to 190° C., from 200° C. to 300° C., from 200° C. to 350° C., or from 300° C. to 400° C.). A thermogravimetric analysis of the degradation of selected polymers of the present disclosure can be found in FIG. 7.

In some embodiments, the polymer has a good solubility in a solvent. In some embodiments, the polymer has a solubility of 20 mg/mL or greater (e.g., 21 mg/mL or greater, 22 mg/mL or greater, 23 mg/mL or greater, 24 mg/mL or greater, 25 mg/mL or greater, 26 mg/mL or greater, 27 mg/mL or greater, 28 mg/mL or greater, 29 mg/mL or greater, 30 mg/mL or greater, 31 mg/mL or greater, 32 mg/mL or greater, 33 mg/mL or greater, 34 mg/mL or greater, 35 mg/mL or greater, 36 mg/mL or greater, 37 mg/mL or greater, 38 mg/mL or greater, 39 mg/mL or greater, 40 mg/mL or greater, 41 mg/mL or greater, 42 mg/mL or greater, 43 mg/mL or greater, 44 mg/mL or greater, 45 mg/mL or greater, 46 mg/mL or greater, 47 mg/mL or greater, 48 mg/mL or greater, 49 mg/mL or greater) in an organic solvent. In some embodiments, the polymer can present a solubility of 50 mg/mL or less (e.g., 21 mg/mL or less, 22 mg/mL or less, 23 mg/mL or less, 24 mg/mL or less, 25 mg/mL or less, 26 mg/mL or less, 27 mg/mL or less, 28 mg/mL or less, 29 mg/mL or less, 30 mg/mL or less, 31 mg/mL or less, 32 mg/mL or less, 33 mg/mL or less, 34 mg/mL or less, 35 mg/mL or less, 36 mg/mL or less, 37 mg/mL or less, 38 mg/mL or less, 39 mg/mL or less, 40 mg/mL or less, 41 mg/mL or less, 42 mg/mL or less, 43 mg/mL or less, 44 mg/mL or less, 45 mg/mL or less, 46 mg/mL or less, 47 mg/mL or less, 48 mg/mL or less, 49 mg/mL or less) in an organic solvent. In some embodiments, the polymer has a solubility of from 20 to 50 mg/mL (e.g., from 21 to 49 mg/mL, from 22 to 48 mg/mL, from 23 to 47 mg/mL, from 24 to 46 mg/mL, from 25 to 45 mg/mL, from 26 to 44 mg/mL, from 27 to 43 mg/mL, from 28 to 42 mg/mL, from 29 to 41 mg/mL, from 30 to 40 mg/mL, or from 40 to 50 mg/mL) in an organic solvent.

Suitable examples of organic solvents can include, but are not limited to, nonpolar solvents, polar aprotic solvents, polar protic solvents, water-miscible solvents, non-coordinating solvents, or a combination thereof. There are many examples of organic solvents known to one of ordinary skill in the art, but suitable examples can include, but are not limited to, acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, dichloromethane, or a combination thereof.

Also disclosed herein are methods of making polymers of the present disclosure. For example, a compound containing a dialkyne and a compound containing a diazide, wherein at least one compound is non-flat, can be dissolved in a solvent. A copper-containing catalyst can be added to the solution and the solution can be stirred to facilitate a reaction. The polymer formed by the reaction can then be extracted from the solution and dried. As one of ordinary skill in the art would appreciate, a wide number of reaction conditions, components, and steps may be possible according to the present disclosure.

Additionally, as shown in FIG. 1 and FIG. 3a, the polymerization reaction described above can be accomplished with one or more monomers. As shown a non-flat and an additional monomer may be provided. In some embodiments, the non-flat monomer may comprise at least one alkyne functional group and the additional monomer may comprise at least one azide functional group. In some embodiments, at least one of the non-flat or the additional monomers may also comprise a spirocenter. It is to be understood that any number of components having at least one alkyne, at least one azide, and at least one spirocenter may undergo the desired polymerization reaction in the presence of a copper-containing catalyst within the scope of this disclosure.

In some embodiments, the polymer can undergo post-polymerization modification, as shown in FIG. 3b. For further functionalization of the polymer or to confer specific properties to the polymer, the polymer can undergo further reactions. For instance, the polymer may undergo C—H arylation, as shown in FIG. 3b, to increase the rigidity of the polymer. Other reaction methods are considered and suitable to further functionalize the polymer and provide more structural diversity to the polymer.

The polymers disclosed can be used in a variety of applications. For instance, the polymers can be used for several applications such as liquid or gaseous membrane separations, such as hydrocarbon processing or water purification. Additionally, the solution-processable polymers of the present disclosure can greatly expand the design space of such industries as thermoplastics, coatings, adhesives, packaging, and the like. A person of ordinary skill in the art would recognize from the present disclosure that the resulting polymers can be manufactured to have any desired form, including, for instance, thin films or hollow fibers. In some embodiments, the polymers can take advantage of solid-phase and structural supports to emphasize the potential for the disclosed polymers to have high free volume, intrinsic microporosity, high chemical stability, and easy post-polymerization functionalization.

Reference will now be made in detail to exemplary embodiments of the disclosed technology, examples of which are illustrated in the accompanying drawings and disclosed herein.

EXAMPLES

Figure 4A:
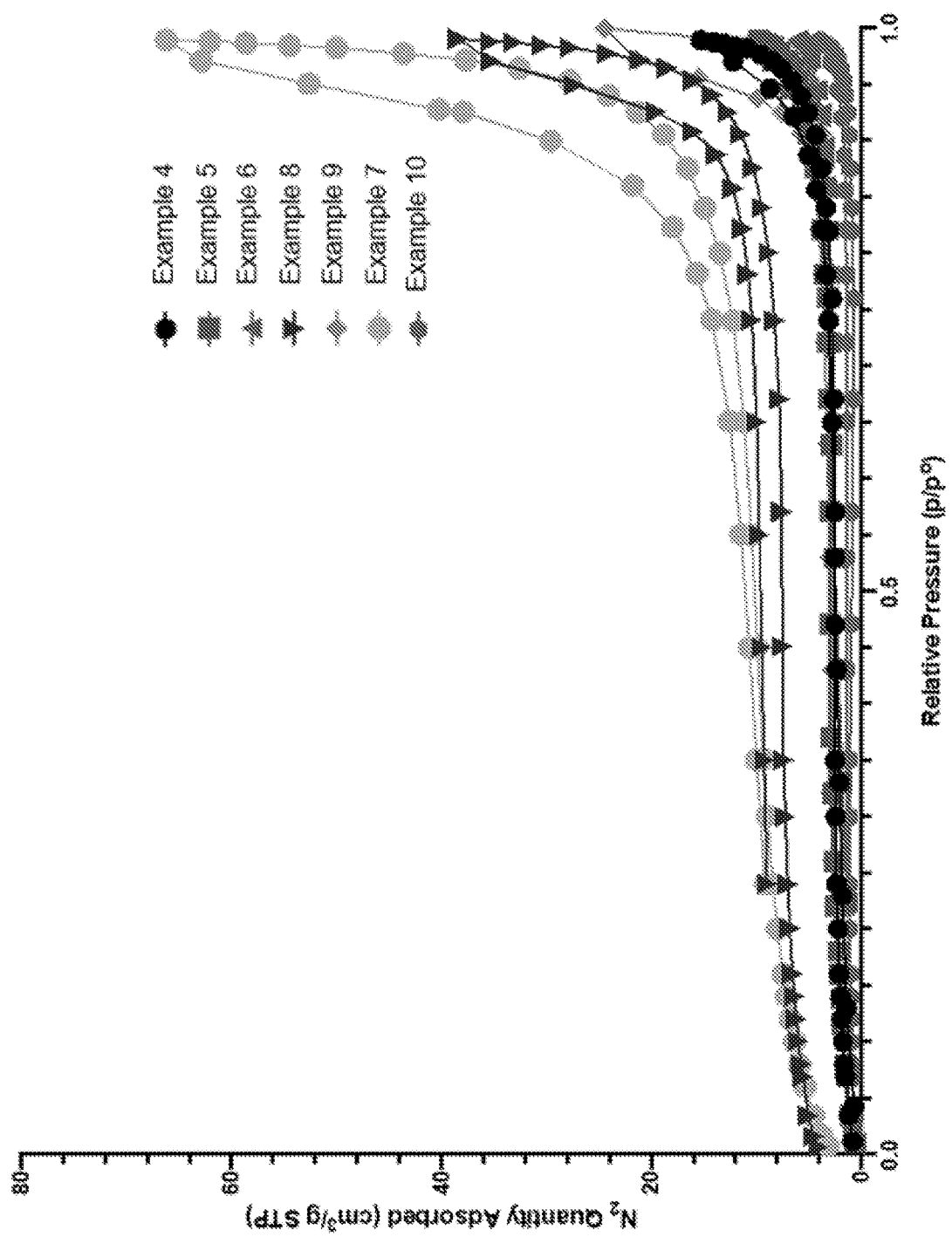
FIG. 4a is a plot of nitrogen physisorption data for some polymers according to some embodiments of the present disclosure.
Figure 4B:
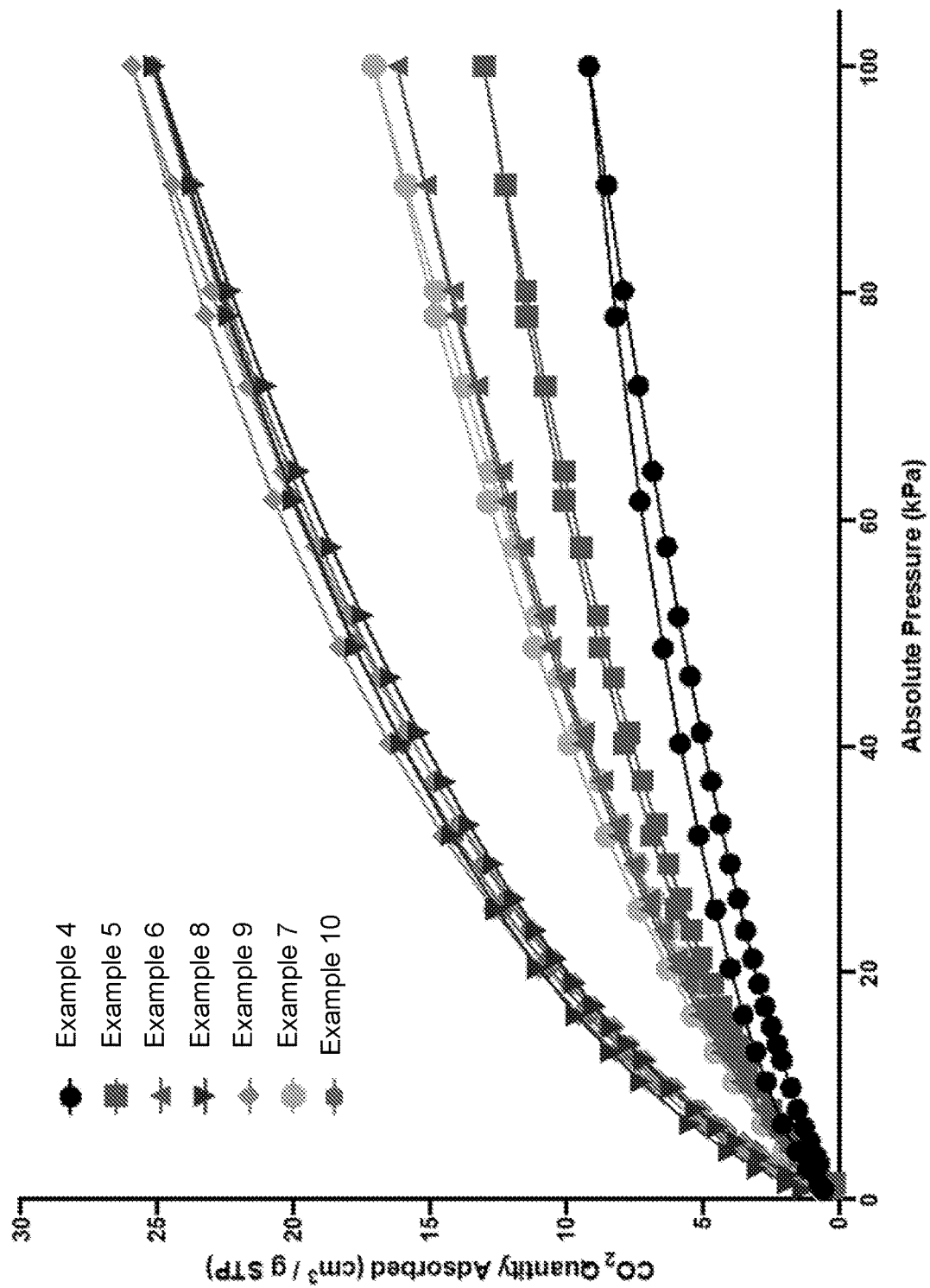
FIG. 4b is a plot of carbon dioxide physisorption data for some polymers according to some embodiments of the present disclosure.

The following examples are provided by way of illustration but not by way of limitation. Nitrogen and carbon dioxide physisorption tests for Examples 4-10 were performed using a normal apparatus. Experimental data for the physisorption properties can be found in FIG. 4a for nitrogen and FIG. 4b for carbon dioxide. Thermogravimetric analysis of the same selected polymers of the present disclosure can also be seen in FIG. 7.

Example 1

Materials and Methods

A spirocenter-containing dialkyne was reacted in a 1:1 ratio with an aryl or alkyl diazide in a non-coordinating solvent (e.g. dichloromethane, chloroform, dichloromethane) with bis(triphenylphosphine) copper (I) acetate as the catalyst. The reaction mixtures were stirred at room temperature and generally, within 5 minutes, reached reflux due to the exothermic nature of the reaction. The polymerizations were generally complete by the time the reaction mixture cooled back to room temperature (ca. 10 min). The reaction mixture was then precipitated into methanol and filtered. The crude polymer was dried in a vacuum oven overnight, redissolved in chloroform, precipitated once more into methanol, and dried at 100° C. in a vacuum oven.

Example 2

Materials and Methods

For propargyloxy substrates, dialkyne (1 equiv.) and diazide (1 equiv.) are stirred in chloroform (0.5 M) until dissolved. Bis(triphenylphosphine) copper (I) acetate (1 mol %) is added and the reaction is stirred at room temperature. Generally, the reaction is highly exothermic and begins to reflux after 3 min. The reaction is complete upon reaching room temperature (15 min). The reaction mixture is precipitated into methanol with vigorous stirring, filtered, and dried in a vacuum oven at 60° C. overnight to provide the polymer as a white to off-white solid.

Example 3

Materials and Methods

For more sterically hindered substrates, dialkyne (1 equiv.) and diazide (1 equiv.) are stirred in chloroform (0.2 M) until dissolved. Bis(triphenylphosphine) copper (I) acetate (2 mol %) is added, the reaction vessel is capped, and the reaction mixture is stirred at 60° C. overnight. The reaction mixture is then precipitated into methanol with vigorous stirring, filtered, and dried in a vacuum oven at 60° C. overnight to provide the polymer as a white to yellow solid.

Example 4

Materials and Methods

Bisphenol A (100 g, 0.439 mol, 1 equiv.) and methanesulfonic acid (10 mL) were stirred in a 500 mL round-bottomed flask at 135° C. for 4 hr. The viscous, burgundy reaction mixture was then poured into water (1.6 L), stirred overnight, and filtered. The crude product was dissolved in the minimal amount of methanol, precipitated with water, and filtered. After pulling dry, the solid was washed with small portions of cold DCM (3×25 mL) and then dried under vacuum to provide the compound as an off-white solid.

To a stirred solution of the above compound (3.08 g, 10 mmol, 1 equiv.) in acetonitrile (75 mL), N-chlorosuccinimide (3.19 g, 24 mmol, 2.4 equiv.) and thiourea (76 mg, 1 mmol, 10 mol %) were added and the solution stirred at room temperature overnight. The acetonitrile was removed via rotary evaporation and the reaction mixture was redissolved in dichloromethane (100 mL). The reaction mixture was quenched with saturated aqueous $Na_2SO_3$. The layers were separated, and the organic layer was washed 3× with water and then brine. The organic layer was dried over sodium sulfate, filtered through a plug of silica gel, and concentrated to provide the compound as an off-white solid.

To a solution of the above compound (3.78 g, 10 mmol, 1 equiv.) and potassium carbonate (5.52 g, 40 mmol, 4 equiv.), propargyl bromide (80% in PhMe, 2.7 mL, 24 mmol, 2.4 equiv.) was added and stirred at reflux overnight. The reaction mixture was cooled to room temperature, filtered, and concentrated. The mixture was then redissolved in dichloromethane and filtered through a plug of silica gel and concentrated via rotary evaporation. The crude product was triturated with methanol and filtered to provide the title compound as a white solid.

Following the general procedure of Example 2, a solution of the above compound (1.81 g, 4 mmol, 1 equiv.), 1,3-bis (azidomethyl)benzene (752 mg, 4 mmol, 1 equiv) and bis(triphenylphosphine) copper (I) acetate (26 mg, 0.04 mmol, 1 mol %) in chloroform (8 mL) was stirred at room temperature for 30 min. The solution was precipitated into vigorously stirring methanol (500 mL), filtered, and dried in a vacuum oven at 60° C. overnight to provide the polymer as a white solid.

Example 5

Materials and Methods

Bisphenol A (100 g, 0.439 mol, 1 equiv.) and methanesulfonic acid (10 mL) were stirred in a 500 mL round-bottomed flask at 135° C. for 4 hr. The viscous, burgundy reaction mixture was then poured into water (1.6 L), stirred overnight, and filtered. The crude product was dissolved in the minimal amount of methanol, precipitated with water, and filtered. After pulling dry, the solid was washed with small portions of cold DCM (3×25 mL) and then dried under vacuum to provide the compound as an off-white solid.

To a stirred solution of the above compound (3.08 g, 10 mmol, 1 equiv.) in acetonitrile (75 mL), N-chlorosuccinimide (3.19 g, 24 mmol, 2.4 equiv.) and thiourea (76 mg, 1 mmol, 10 mol %) were added and the solution stirred at room temperature overnight. The acetonitrile was removed via rotary evaporation and the reaction mixture was redissolved in dichloromethane (100 mL). The reaction mixture was quenched with saturated aqueous $Na_2SO_3$. The layers were separated, and the organic layer was washed 3× with water and then brine. The organic layer was dried over sodium sulfate, filtered through a plug of silica gel, and concentrated to provide the compound as an off-white solid.

To a solution of the above compound (3.78 g, 10 mmol, 1 equiv.) and potassium carbonate (5.52 g, 40 mmol, 4 equiv.), propargyl bromide (80% in PhMe, 2.7 mL, 24 mmol, 2.4 equiv.) was added and stirred at reflux overnight. The reaction mixture was cooled to room temperature, filtered, and concentrated. The mixture was then redissolved in dichloromethane and filtered through a plug of silica gel and concentrated via rotary evaporation. The crude product was triturated with methanol and filtered to provide the title compound as a white solid.

Following the general procedure of Example 2, a solution of the above compound (1.81 g, 4 mmol, 1 equiv.), 1,4-bis(azidomethyl)-2,3,5,6-tetramethylbenzene (973 mg, 4 mmol, 1 equiv) and bis(triphenylphosphine) copper (I) acetate (26 mg, 0.04 mmol, 1 mol %) in chloroform (8 mL) was stirred at room temperature for 60 min. The solution was precipitated into vigorously stirring methanol (500 mL), filtered, and dried in a vacuum oven at 60° C. overnight to provide the polymer as a white solid.

Example 6

Materials and Methods

Bisphenol A (100 g, 0.439 mol, 1 equiv.) and methanesulfonic acid (10 mL) were stirred in a 500 mL round-bottomed flask at 135° C. for 4 hr. The viscous, burgundy reaction mixture was then poured into water (1.6 L), stirred overnight, and filtered. The crude product was dissolved in the minimal amount of methanol, precipitated with water, and filtered. After pulling dry, the solid was washed with small portions of cold DCM (3×25 mL) and then dried under vacuum to provide the compound as an off-white solid.

To a solution of the above compound (5.0 g, 16.3 mmol, 1 equiv.) in dichloromethane (50 mL), t-BuOH (5 mL, 55 mmol) was added. The resulting mixture was stirred at room temperature and $MeSO_3H$ (8 mL) was added slowly. After stirring for 4 h at room temperature, the mixture was evaporated under reduced pressure to remove dichloromethane and water (100 mL) was added. The resulting mixture was sonicated, filtered, and the solid was washed with water to provide the compound as a white solid.

A solution of the above compound from the previous step, propargyl bromide (80 wt % in PhMe, 4 mL, 35.6 mmol, 2.2 equiv.), and $K_2CO_3$ (8.94 g, 64.8 mmol, 4.4 equiv.) in acetonitrile (100 mL) was refluxed overnight. After cooling to room temperature, the acetonitrile was removed via rotary evaporation and the crude product was redissolved in dichloromethane. The mixture was then filtered through a silica plug, concentrated, triturated with methanol, and filtered to provide the compound as a white solid.

Following the general procedure of Example 3, a solution of the above compound from the previous step (4.97 g, 10 mmol, 1 equiv.), 1,4-bis(azidomethyl)-2,3,5,6-tetramethylbenzene (2.44 g, 10 mmol, 1 equiv) and bis(triphenylphosphine) copper (I) acetate (128 mg, 0.2 mmol, 2 mol %) in chloroform (50 mL) was stirred at 60° C. overnight. The solution was precipitated into vigorously stirring methanol (1 L), filtered, and dried in a vacuum oven at 60° C. overnight to provide the polymer as a white solid.

Example 7

Materials and Methods

Bisphenol A (100 g, 0.439 mol, 1 equiv.) and methanesulfonic acid (10 mL) were stirred in a 500 mL round-bottomed flask at 135° C. for 4 hr. The viscous, burgundy reaction mixture was then poured into water (1.6 L), stirred overnight, and filtered. The crude product was dissolved in the minimal amount of methanol, precipitated with water, and filtered. After pulling dry, the solid was washed with small portions of cold DCM (3×25 mL) and then dried under vacuum to provide the compound as an off-white solid.

To a solution of the above compound (5.0 g, 16.3 mmol, 1 equiv.) in dichloromethane (50 mL), t-BuOH (5 mL, 55 mmol) was added. The resulting mixture was stirred at room temperature and $MeSO_3H$ (8 mL) was added slowly. After stirring for 4 h at room temperature, the mixture was evaporated under reduced pressure to remove dichloromethane and water (100 mL) was added. The resulting mixture was sonicated, filtered, and the solid was washed with water to provide the compound as a white solid.

A solution of the above compound from the previous step, propargyl bromide (80 wt % in PhMe, 4 mL, 35.6 mmol, 2.2 equiv.), and $K_2CO_3$ (8.94 g, 64.8 mmol, 4.4 equiv.) in acetonitrile (100 mL) was refluxed overnight. After cooling to room temperature, the acetonitrile was removed via rotary evaporation and the crude product was redissolved in dichloromethane. The mixture was then filtered through a silica plug, concentrated, triturated with methanol, and filtered to provide the compound as a white solid.

Following the general procedure of Example 3, a solution of the above compound from the previous step (496.7 mg, 1 mmol, 1 equiv.), 3,3'-dimethyl-4,4'-diazidobiphenyl (264.3 mg, 1 mmol, 1 equiv) and bis(triphenylphosphine) copper (I) acetate (13 mg, 0.02 mmol, 2 mol %) in chloroform (5 mL) was stirred at 60° C. overnight. The solution was precipitated into vigorously stirring methanol (250 mL), filtered, and dried in a vacuum oven at 60° C. overnight to provide the polymer as a yellow solid.

Example 8

Materials and Methods

Bisphenol A (100 g, 0.439 mol, 1 equiv.) and methanesulfonic acid (10 mL) were stirred in a 500 mL round-bottomed flask at 135° C. for 4 hr. The viscous, burgundy reaction mixture was then poured into water (1.6 L), stirred overnight, and filtered. The crude product was dissolved in the minimal amount of methanol, precipitated with water, and filtered. After pulling dry, the solid was washed with small portions of cold DCM (3×25 mL) and then dried under vacuum to provide the compound as an off-white solid.

To a solution of the above compound in the previous step (3.08 g, 10 mmol, 1 equiv.) and $K_2CO_3$ (4.14 g, 30 mmol, 3 equiv.) in acetonitrile (50 mL), MeI (1.5 mL, 24 mmol, 2.4 equiv.) was added and the mixture was stirred under reflux overnight. The reaction mixture was cooled to room temperature, diluted with dichloromethane, filtered through a silica plug, and concentrated via rotary evaporation. The crude product was triturated with methanol and filtered to provide the compound as a white solid.

Bromine (1.1 mL, 21 mmol, 2.1 equiv.) was added dropwise to a solution of the above compound in the previous step (3.36 g, 10 mmol, 1 equiv.) in dichloromethane (50 mL) and the resulting solution was stirred at room temperature for 1 h. The reaction was then quenched by the addition of saturated aqueous $NaHCO_3$ and saturated aqueous $Na_2SO_3$. The layers were separated, and the organic layer was washed with water and brine, dried over $MgSO_4$, filtered through a silica plug, and concentrated. The resulting solid was triturated with methanol, filtered, and dried under vacuum to provide the compound as an off-white solid.

A 100 mL Schlenk flask equipped with a magnetic stir bar and rubber septum was charged with the above compound of the previous step (3.64 g, 7.4 mmol, 1 equiv.), dppf-Pd-G3 precatalyst (136 mg, 0.15 mmol, 2 mol %), and CuI (70 mg, 0.37 mmol, 5 mol %). The flask was evacuated and back-filled with argon (this procedure was performed a total of three times). Trimethylsilylacetylene (2.5 mL, 17.8 mmol, 2.4 equiv.) and triethylamine (30 mL) were added via syringe and the reaction mixture was stirred at 80° C. overnight. After cooling to room temperature, the reaction mixture was concentrated then redissolved in DCM, filtered through a silica plug, and concentrated. The resulting crude product was triturated with methanol, filtered, and dried under vacuum to provide the compound as a fluffy, grey solid.

TBAF (1 M in THF, 6.6 mL, 6.6 mmol, 2.2 equiv.) was added to a solution of the above compound in the previous step (1.58 g, 3 mmol, 1 equiv.) in THF (10 mL). The reaction mixture was stirred at room temperature for 30 min. The solvent was then removed via rotary evaporation and the crude product redissolved in DCM (25 mL). The DCM solution was washed with water (3×25 mL) and brine (25 mL), dried over $MgSO_4$, filtered through a silica plug, and concentrated to provide the compound as an off-white solid.

Following the general procedure of Example 3, a solution of the above compound in the previous step (1.54 g, 4 mmol, 1 equiv.), 1,4-bis(azidomethyl)-2,3,5,6-tetramethylbenzene (973 mg, 4 mmol, 1 equiv) and bis(triphenylphosphine) copper (I) acetate (52 mg, 0.08 mmol, 2 mol %) in chloroform (20 mL) was stirred at 60° C. overnight. The solution was precipitated into vigorously stirring methanol (500 mL), filtered, and dried in a vacuum oven at 60° C. overnight to provide the polymer as an off-white solid.

Example 9

Materials and Methods

Bisphenol A (100 g, 0.439 mol, 1 equiv.) and methanesulfonic acid (10 mL) were stirred in a 500 mL round-bottomed flask at 135° C. for 4 hr. The viscous, burgundy reaction mixture was then poured into water (1.6 L), stirred overnight, and filtered. The crude product was dissolved in the minimal amount of methanol, precipitated with water, and filtered. After pulling dry, the solid was washed with small portions of cold DCM (3×25 mL) and then dried under vacuum to provide the compound as an off-white solid.

To a solution of the above compound in the previous step (3.08 g, 10 mmol, 1 equiv.) and $K_2CO_3$ (4.14 g, 30 mmol, 3 equiv.) in acetonitrile (50 mL), MeI (1.5 mL, 24 mmol, 2.4 equiv.) was added and the mixture was stirred under reflux overnight. The reaction mixture was cooled to room temperature, diluted with dichloromethane, filtered through a silica plug, and concentrated via rotary evaporation. The crude product was triturated with methanol and filtered to provide the compound as a white solid.

Bromine (1.1 mL, 21 mmol, 2.1 equiv.) was added dropwise to a solution of the above compound in the previous step (3.36 g, 10 mmol, 1 equiv.) in dichloromethane (50 mL) and the resulting solution was stirred at room temperature for 1 h. The reaction was then quenched by the addition of saturated aqueous $NaHCO_3$ and saturated aqueous $Na_2SO_3$. The layers were separated, and the organic layer was washed with water and brine, dried over $MgSO_4$, filtered through a silica plug, and concentrated. The resulting solid was triturated with methanol, filtered, and dried under vacuum to provide the compound as an off-white solid.

A 100 mL Schlenk flask equipped with a magnetic stir bar and rubber septum was charged with the above compound of the previous step (3.64 g, 7.4 mmol, 1 equiv.), dppf-Pd-G3 precatalyst (136 mg, 0.15 mmol, 2 mol %), and CuI (70 mg, 0.37 mmol, 5 mol %). The flask was evacuated and back-filled with argon (this procedure was performed a total of three times). Trimethylsilylacetylene (2.5 mL, 17.8 mmol, 2.4 equiv.) and triethylamine (30 mL) were added via syringe and the reaction mixture was stirred at 80° C. overnight. After cooling to room temperature, the reaction mixture was concentrated then redissolved in DCM, filtered through a silica plug, and concentrated. The resulting crude product was triturated with methanol, filtered, and dried under vacuum to provide the compound as a fluffy, grey solid.

TBAF (1 M in THF, 6.6 mL, 6.6 mmol, 2.2 equiv.) was added to a solution of the above compound in the previous step (1.58 g, 3 mmol, 1 equiv.) in THF (10 mL). The reaction mixture was stirred at room temperature for 30 min. The solvent was then removed via rotary evaporation and the crude product redissolved in DCM (25 mL). The DCM solution was washed with water (3×25 mL) and brine (25 mL), dried over $MgSO_4$, filtered through a silica plug, and concentrated to provide the compound as an off-white solid.

Following the general procedure of Example 3, a solution of the above compound in the previous step (384.5 mg, 1 mmol, 1 equiv.), 3,3'-dimethyl-4,4'-diazidobiphenyl (264.3 mg, 1 mmol, 1 equiv) and bis(triphenylphosphine) copper (I) acetate (13 mg, 0.02 mmol, 2 mol %) in chloroform (5 mL) was stirred at 60° C. overnight. The solution was precipitated into vigorously stirring methanol (250 mL), filtered, and dried in a vacuum oven at 60° C. overnight to provide the polymer as a yellow solid.

Example 10

Materials and Methods

Bisphenol A (100 g, 0.439 mol, 1 equiv.) and methanesulfonic acid (10 mL) were stirred in a 500 mL round-bottomed flask at 135° C. for 4 hr. The viscous, burgundy reaction mixture was then poured into water (1.6 L), stirred overnight, and filtered. The crude product was dissolved in the minimal amount of methanol, precipitated with water, and filtered. After pulling dry, the solid was washed with small portions of cold DCM (3×25 mL) and then dried under vacuum to provide the compound as an off-white solid.

To a solution of the above compound in the previous step (3.08 g, 10 mmol, 1 equiv.) and $K_2CO_3$ (4.14 g, 30 mmol, 3 equiv.) in acetonitrile (50 mL), MeI (1.5 mL, 24 mmol, 2.4 equiv.) was added and the mixture was stirred under reflux overnight. The reaction mixture was cooled to room temperature, diluted with dichloromethane, filtered through a silica plug, and concentrated via rotary evaporation. The crude product was triturated with methanol and filtered to provide the compound as a white solid.

Bromine (1.1 mL, 21 mmol, 2.1 equiv.) was added dropwise to a solution of the above compound in the previous step (3.36 g, 10 mmol, 1 equiv.) in dichloromethane (50 mL) and the resulting solution was stirred at room temperature for 1 h. The reaction was then quenched by the addition of saturated aqueous $NaHCO_3$ and saturated aqueous $Na_2SO_3$. The layers were separated, and the organic layer was washed with water and brine, dried over $MgSO_4$, filtered through a silica plug, and concentrated. The resulting solid was triturated with methanol, filtered, and dried under vacuum to provide the compound as an off-white solid.

A 100 mL Schlenk flask equipped with a magnetic stir bar and rubber septum was charged with the above compound of the previous step (3.64 g, 7.4 mmol, 1 equiv.), dppf-Pd-G3 precatalyst (136 mg, 0.15 mmol, 2 mol %), and CuI (70 mg, 0.37 mmol, 5 mol %). The flask was evacuated and backfilled with argon (this procedure was performed a total of three times). Trimethylsilylacetylene (2.5 mL, 17.8 mmol, 2.4 equiv.) and triethylamine (30 mL) were added via syringe and the reaction mixture was stirred at 80° C. overnight. After cooling to room temperature, the reaction mixture was concentrated then redissolved in DCM, filtered through a silica plug, and concentrated. The resulting crude product was triturated with methanol, filtered, and dried under vacuum to provide the compound as a fluffy, grey solid.

TBAF (1 M in THF, 6.6 mL, 6.6 mmol, 2.2 equiv.) was added to a solution of the above compound in the previous step (1.58 g, 3 mmol, 1 equiv.) in THF (10 mL). The reaction mixture was stirred at room temperature for 30 min. The solvent was then removed via rotary evaporation and the crude product redissolved in DCM (25 mL). The DCM solution was washed with water (3×25 mL) and brine (25 mL), dried over $MgSO_4$, filtered through a silica plug, and concentrated to provide the compound as an off-white solid.

Following the general procedure of Example 3, a solution of the above compound in the previous step (769 mg, 2 mmol, 1 equiv.), 9,9-bis(4-azidophenyl)fluorene (801 mg, 2 mmol, 1 equiv) and bis(triphenylphosphine) copper (I) acetate (26 mg, 0.02 mmol, 2 mol %) in chloroform (10 mL) was stirred at 60° C. overnight. The solution was precipitated into vigorously stirring methanol (500 mL), filtered, and dried in a vacuum oven at 60° C. overnight to provide the polymer as an amber-colored solid.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A polymer, comprising:
   at least one azide functional group;
   at least one alkyne functional group; and
   a spirocenter,
     wherein the polymer is obtained from (i) a first monomer having at least a first azide functional group and (ii) a second monomer having at least a first alkyne functional group, and
     wherein at least one monomer of the first and second monomers has a conformational bend in which one or more bonds connecting the at least one monomer to one or more additional monomers in a monomer chain are 30 degrees or greater away from coplanarity.

2. The polymer of claim 1, wherein the polymer has a degree of polymerization of 30 or greater based on the number-average degree of polymerization.

3. The polymer of claim 1, wherein the polymer has a molecular weight of 60,000 g/mol or greater based on the weight average molecular weights for the polymer.

4. The polymer of claim 1, wherein the polymer has a polydispersity index of 1 or greater.

5. The polymer of claim 1, wherein the polymer has a solubility of 20 mg/mL or greater in common organic solvents, and wherein the common organic solvents comprise one or more of acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, and dichloromethane.

6. The polymer of claim 1, wherein the polymer further comprises:
   monomers comprising:
     at least two azide functional groups; and
     at least two alkyne functional groups, and
   wherein the polymer comprises a polytriazole.

7. The polymer of claim 1, wherein the polymer comprises two or more spirocenters.

8. The polymer of claim 1, further comprising one or more of an alkane group, an ester functional group, a halide functional group, a cycloalkane functional group, an aromatic functional group, an amide functional group, a heterocyclic functional group, a thioester functional group, an imide functional group, a carbamate functional group, and a carbonate functional group.

\* \* \* \* \*